United States Patent
Matsumoto et al.

(10) Patent No.: US 8,576,206 B2
(45) Date of Patent: Nov. 5, 2013

(54) PHASE MODULATING APPARATUS AND PHASE MODULATING METHOD

(75) Inventors: Naoya Matsumoto, Hamamatsu (JP); Norihiro Fukuchi, Hamamatsu (JP); Takashi Inoue, Hamamatsu (JP); Yasunori Igasaki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 721 days.

(21) Appl. No.: 12/746,183

(22) PCT Filed: Dec. 4, 2008

(86) PCT No.: PCT/JP2008/072057
§ 371 (c)(1),
(2), (4) Date: Aug. 9, 2010

(87) PCT Pub. No.: WO2009/072563
PCT Pub. Date: Jun. 11, 2009

(65) Prior Publication Data
US 2010/0295836 A1    Nov. 25, 2010

(30) Foreign Application Priority Data
Dec. 5, 2007    (JP) .............................. P2007-315212

(51) Int. Cl.
*G09G 5/00*    (2006.01)

(52) U.S. Cl.
USPC ............. 345/204; 345/87; 345/100; 345/211; 345/693; 359/237; 359/246; 359/286; 359/325

(58) Field of Classification Search
USPC ........... 345/87–100, 204, 211–213, 690–693; 359/237–239, 246, 247, 286, 287, 325, 359/326
See application file for complete search history.

(56) References Cited

U.S. PATENT DOCUMENTS

| | | | |
|---|---|---|---|
| 7,358,930 B2 * | 4/2008 | Childers | 345/32 |
| 2008/0107372 A1 * | 5/2008 | Fujimori et al. | 385/2 |
| 2010/0026620 A1 * | 2/2010 | Tanaka et al. | 345/100 |

FOREIGN PATENT DOCUMENTS

| | | |
|---|---|---|
| JP | H4-163529 | 6/1992 |
| JP | 3071999 | 5/2000 |

(Continued)

OTHER PUBLICATIONS

Norihiro Fukuchi et al., "Oblique-Incidence Characteristics of a Parallel-Alligned Nematic-Liquid-Crystal Spatial Light Modulator," Optical Review, 2005, pp. 372-377, vol. 12, No. 5.

(Continued)

*Primary Examiner* — Kevin M Nguyen
*Assistant Examiner* — Jennifer Nguyen
(74) *Attorney, Agent, or Firm* — Drinker Biddle & Reath LLP

(57) ABSTRACT

The present invention relates to a phase modulating apparatus capable of highly accurately and easily correcting the phase modulation characteristic of a reflective electric address spatial light modulator even when a condition of input light is changed. In the LCOS phase modulating apparatus, an input unit inputs the condition of the input light, and a processing unit sets an input value for each pixel. A correction value deriving unit determines a correction condition according to the condition of the input light. A control input value converting unit converts the input value set for each pixel into a corrected input value based on the correction condition. An LUT processing unit converts the corrected input value into a voltage value, and drives each pixel by using a drive voltage equivalent to the converted voltage value.

13 Claims, 18 Drawing Sheets

(56) References Cited

FOREIGN PATENT DOCUMENTS

| JP | 2001-272634 | 10/2001 |
|---|---|---|
| JP | 2006-119427 | 5/2006 |
| JP | 2009-031367 | 2/2009 |
| WO | 03/036368 | 5/2003 |
| WO | 2005/106571 | 11/2005 |
| WO | 2006/047834 | 5/2006 |

OTHER PUBLICATIONS

Jamie Harriman et al., "Improving spatial light modulator performance through phase compensation," Proceedings of SPIE, Oct. 2004, vol. 5553.

Takashi Inoue, "Highly stable wavefront control using a hybrid liquid-crystal spatial light modulator," Proceedings of SPIE, Aug. 2006, vol. 6306.

Jacek Kacperski et al., "Active, LCoS based laser interferometer for microelements studies," Optics Express, Oct. 16, 2006, vol. 14, No. 21.

Mitsuo Takeda et al., "Fourier-transform method of fringe-pattern analysis for computer-based topography and interferometry," Journal of Optical Society of America, Jan. 1982, pp. 156-160, vol. 72, No. 1.

Xiaodong Xun et al., "Phase calibration of spatially nonuniform spatial light modulators," Applied Optics, Dec. 10, 2004, vol. 43, No. 35.

\* cited by examiner

| REFERENCE DA INPUT VALUE R | VALUE A | PHASE MODULATION AMOUNT φ [π rad] | | |
|---|---|---|---|---|
| | | WAVELENGTH: 405 nm, ANGLE: 0[deg] | WAVELENGTH: 1064 nm, ANGLE: 0[deg] | WAVELENGTH: 633 nm, ANGLE: 45[deg] |
| 0 | 62 | 0 | 0 | 0 |
| 1 | 66 | 0.00784 | 0.002497 | 0.002626 |
| 2 | 69 | 0.01568 | 0.004994 | 0.005252 |
| ... | ... | ... | ... | ... |
| 254 | 1815 | 1.99136 | 0.634191 | 0.666963 |
| 255 | 1818 | 1.9992 | 0.636688 | 0.669589 |
| 256 | 1822 | 2.00704 | 0.639185 | 0.672214 |
| ... | ... | ... | ... | ... |
| 510 | 2776 | 3.9984 | 1.273376 | 1.338177 |
| 511 | 2778 | 4.00624 | 1.275873 | 1.341803 |
| 512 | 2780 | 4.01408 | 1.278369 | 1.344429 |
| ... | ... | ... | ... | ... |
| 766 | 3220 | 6.00544 | 1.912561 | 2.011392 |
| 767 | 3222 | 6.01328 | 1.915057 | 2.014017 |
| 768 | 3223 | 6.02112 | 1.917554 | 2.016643 |
| ... | ... | ... | ... | ... |
| 849 | 3340 | 6.65616 | 2.119796 | 2.229336 |
| 850 | 3341 | 6.664 | 2.122293 | 2.231962 |

US 8,576,206 B2

PHASE MODULATING APPARATUS AND PHASE MODULATING METHOD

TECHNICAL FIELD

The present invention relates to a phase modulating apparatus and a phase modulating method using a reflective electric address spatial light modulator.

BACKGROUND ART

Conventionally, as reflective electric address spatial light modulators, an LCOS-spatial light modulator (LCOS-SLM) using LCOS (Liquid Crystal On Silicon) is known. When a voltage is applied to a pixel electrode, liquid crystal molecules of the LCOS-spatial light modulator are rotated on a surface vertical to a substrate to change a phase modulation amount of an incident light. In this case, however, the phase modulation amount changes in a nonlinear manner relative to the voltage applied to the pixel electrode, and thus, there arises a problem that a desired phase modulation amount cannot be obtained.

A silicon substrate of the LCOS-spatial light modulator is processed through a semiconductor process, and thus, a thick silicon substrate cannot be obtained, and the mechanical strength is weak. As a result, as shown in FIG. 1, the silicon substrate is distorted due to stress generated at each process during an element fabrication. This decreases the flatness of the mirror surface of the LCOS-spatial light modulator. Further, due to the distortion of the silicon substrate, the thickness of a liquid crystal layer of the LCOS-spatial light modulator is uneven. This leads to the following problems: the phase modulation amount in each pixel differs depending on the thickness of the liquid crystal layer. Because of the variation of the phase modulation amount and the distortion of the reflective surface, a waveform surface reflected and output in the LCOS SLM is greatly distorted. Moreover, the phase modulation amount differs depending on each pixel. Specifically, a phase modulation amount $\phi$ (V, x, y) is expressed by the following equation, where x, y denote the position of the pixel, V denotes the voltage:

$$\Phi(V,x,y)=\phi(V,x,y)+\Phi_0(x,y)[\pi \text{ rad}]$$

By using this equation, the phase modulation amount $\phi(V, x, y)$ can be determined by a sum of the amount $\phi(V, x, y)$ dependent on voltage and the amount $\phi_0(x, y)$ not dependent on voltage. It is noted that $\phi(V, x, y)$ is expressed by the following equation:

$$\phi(V)=2\Delta n(V)d(x,y)*2\pi/\lambda [\text{rad}]$$

Herein, $\Delta n(V)$ denotes a birefringence relative to a polarization component having an electric field vibrating in a direction parallel to an orientation of liquid crystal. $d(x, y)$ denotes the thickness of the liquid crystal layer at a position $(x, y)$. In each pixel, a relationship between the voltage V and the $\phi(V, x, y)$ is nonlinear. Resulting from $d(x, y)$, $\phi(V, x, y)$ takes a different value for each pixel. On the other hand, the $\phi_0(x, y)$ arises mainly from the distortion on the reflective surface of the LCOS-spatial light modulator. Hereinafter, the nonlinearity between the voltage and the phase modulation amount and the variation in the phase modulation amount for each pixel, arising from $\phi(V, x, y)$, are collectively called a voltage-dependent phase modulation characteristic, and the variation in the phase modulation amount for each position $(x, y)$, arising from $\phi_0(x, y)$, is called a voltage non-dependent distortion. There are proposed methods for correcting the voltage-dependent phase modulation characteristic and the voltage non-dependent distortion (for example, Non-patent Documents 1 to 3).

There is also proposed a method of correcting a voltage-dependent phase modulation characteristic in a phase modulating module configured by a reflective light address spatial light modulator and a liquid crystal display, i.e., the phase modulation characteristic of the reflective light address spatial light modulator relative to the voltage applied to the liquid crystal display (for example, Non-patent Document 4). In the correcting method in the Non-patent Document 4, the voltage-dependent phase modulation characteristic is measured by using a polarimetric interferometer, a look-up table (LUT) is created for each block (one block corresponds to 4×4 pixels) based on the measurement result, and the voltage-dependent phase modulation characteristic is corrected by using the look-up table.

In another proposed method, a distortion of an output waveform surface of a reflective light address spatial light modulator is measured in a phase modulating module configured by the reflective light address spatial light modulator and a liquid crystal display, and the voltage non-dependent distortion is corrected by using a pattern cancelling the distortion (for example, Patent Document 1).

There is also proposed a reflective liquid crystal projector configured by a reflective light address spatial light modulator and a liquid crystal display device. In this device, an operation voltage to be applied to the liquid crystal display device is changed for each one of the blocks divided in a plurality present within a reading light irradiation surface of the reflective light address spatial light modulator, and thereby, an amount of writing light entering the reflective light address spatial light modulator is adjusted. Reading light obtained from a light source having a certain size will not become complete parallel light, and thus, an incident angle of the reading light differs depending on each block within the reading light irradiation surface of the optical writing spatial light modulator. However, the writing light amount is adjusted for each divided block, and thus, the output characteristic can be rendered uniform across all the blocks (for example, Patent Document 2).

Moreover, there is also proposed a method in which the reading light diagonally enters the reflective light address spatial light modulator, thereby achieving phase modulation of the reading light (for example, Non-patent Document 5).

Patent Document 1: WO 2003/036368
Patent Document 2: Japanese Patent No. 3071999
Non-patent Document 1: "Phase calibration of spatially non uniform spatial light modulator", Applied Opt., "Vol. 43, No. 35, December 2004]
Non-patent Document 2: "Improving spatial light modulator performance through phase compensation", Proc. SPIE, Vol. 5553, October 2004
Non-patent Document 3: "Active, LCOS based laser interferometer for microelements studies", Opt. Express, Vol. 14, No. 21, October 2006
Non-patent Document 4: "Highly stable wave front control using a hybrid liquid-crystal spatial light modulator", Proc. SPIE, Vol. 6306, August 2006
Non-patent Document 5: "Oblique-Incidence Characteristics of a Parallel-Aligned Nematic-Liquid-Crystal Spatial Light Modulator", OPTICAL REVIEW, Vol. 12, No. 5 (2005)372-377
Non-patent Document 6: M. Takeda, H. Ina, and S. Kobayashi, "Fourier-transform method of fringe pattern analysis for computer-based topography and interferometry", J. Opt. Soc. Am., Vol. 72, 156-160 (1982).

DISCLOSURE OF THE INVENTION

Problems that the Invention is to Solve

The present inventors have examined the above-described conventional technologies, and as a result, have discovered the following problems. That is, That is, in the Non-patent Documents 1 to 3, in the LCOS SLM, a dual-beam laser interferometer is used to measure the distortion of the output light waveform surface, thereby correcting the distortion. The measurement by using the dual-beam laser interferometer, however, has a problem that the voltage-dependent phase modulation characteristic and the voltage non-dependent distortion are mixed and measured. Moreover, in the Non-patent Document 1, upon correction of the nonlinearity, a relatively near linear portion is merely extracted from non-linear characteristics. This does not permit an exact correction from the nonlinear characteristic.

When the input light is entered vertically on the LCOS SLM, it is necessary to split the input light and the output light by using a beam splitter. In this case, however, because of the presence of the beam splitter, certain amounts of the input light and the output light are lost. If the input light is entered diagonally on the LCOS SLM, then the use of the beam splitter is no longer necessary. This can prevent loss of the light amount.

However, as described in the Non-patent Document 5, the birefringence $\Delta n(V)$ of the liquid crystal depends on the incident angle of the input light.

Then, it is preferable that even when the incident angle of the input light is changed, the voltage-dependent phase modulation characteristic and the voltage non-dependent distortion of the LCOS SLM can be highly accurately and easily corrected according to the change.

The present invention has been developed to eliminate the problems described above. It is an object of the present invention to provide a phase modulating apparatus and a phase modulating method capable of highly accurately and easily correcting a phase modulation characteristic of a reflective electric address spatial light modulator even when an input light condition is changed.

Means for Solving the Problems

In order to achieve the above-described object, a phase modulating apparatus according to the present invention comprises a reflective electric address spatial light modulator, input light condition inputting means, input value setting means, correction condition determining means, input value converting means, and driving means.

The reflective electric address spatial light modulator includes a plurality of pixels each being 2-dimensionally aligned adjacent to each other. Each pixel performs a phase modulation on input light in accordance with application of a drive voltage. The input light condition inputting means inputs a condition of the input light. The input value setting means sets an input value for each pixel. The correction condition determining means determines a correction condition according to the condition of the input light. The input value converting means converts the input value set for each pixel into a corrected input value based on the correction condition. The driving means converts the corrected input value into a voltage value thereby to drive each pixel by using the drive voltage having the voltage value.

In accordance with the phase modulating apparatus having the above-described structure, the correction condition determining means determines the correction condition in accordance with the condition of the input light. Thus, the phase modulating apparatus can obtain the desired phase modulation amount by an appropriate correction, even when the condition of the input light changes.

Preferably, the correction condition determining means determines the correction condition according to the incident angle of the input light. Thus, the phase modulating apparatus can obtain the desired phase modulation amount by an appropriate correction, even when the incident angle of the input light changes.

Preferably, the correction condition determining means determines the correction condition according to a wavelength of the input light. Thus, the phase modulating apparatus can obtain the desired phase modulation amount by an appropriate correction, even when the wavelength of the input light changes.

Preferably, the correction condition determining means determines the correction condition in accordance with the incident angle of the input light and a wavelength of the input light. Thus, the phase modulating apparatus can obtain the desired phase modulation amount by an appropriate correction, even when the incident angle and the wavelength of the input light change.

The phase modulating apparatus according to the present invention may further comprise the steps of correction value output means for outputting a correction value used for correcting a voltage non-dependent distortion, and correction value converting means for converting the correction value output from the correction value output means into a corrected correction value based on the correction condition. Preferably, the driving means sets the voltage value based on the corrected input value and the corrected correction value. Thereby, the correction value converting means converts the correction value used for correcting the voltage non-dependent distortion into the corrected correction value in accordance with the correction condition. The phase modulating apparatus can obtain the desired phase modulation amount by appropriately correcting the voltage non-dependent distortion, even when the condition of the input light changes.

Preferably, the reflective electric address spatial light modulator includes an LCOS-spatial light modulator. Thereby, in the LCOS-spatial light modulator, the desired phase modulation amount can be obtained by an appropriate correction, even when the condition of the input light changes.

The phase modulating apparatus according to the present invention may further comprise a step of look-up table storing means for storing therein one look-up table (LUT) relative to at least one pixel. The look-up table stores a plurality of different reference values and a plurality of voltage instruction values. There is a one-to-one correspondence between the plurality of different reference values and the plurality of voltage instruction values, and each voltage instruction value indicates a corresponding voltage value. The driving means refers to the look-up table to select the voltage-value instruction value relative to the reference value equal to the corrected input value. The driving means determines the voltage value indicated by the voltage instruction value based on the selected voltage instruction value. Thus, when the look-up table is referred to, the corrected input value can be converted into the value corresponding to the voltage value. As a result, a correction in which the phase modulation amount relative to the input value is rendered linear can be effectively performed.

In this case, in the look-up table, the plurality of reference values include a minimum reference value, an intermediate reference value, and a maximum reference value. The intermediate reference value is larger than the minimum reference value and smaller than the maximum reference value. A total number of reference values larger than the minimum reference value and smaller than the intermediate reference value is 254. The plurality of voltage instruction values include a minimum voltage instruction value, an intermediate voltage instruction value, and a maximum voltage instruction value. The intermediate voltage instruction value is larger than the minimum voltage instruction value and smaller than the maximum voltage instruction value. The minimum reference value corresponds to the minimum voltage instruction value. The intermediate reference value corresponds to the intermediate voltage instruction value. The maximum reference value corresponds to the maximum voltage instruction value. A plurality of voltage instruction values indicate a plurality of voltage values. The plurality of voltage values include a minimum voltage value, an intermediate voltage value, and a maximum voltage value. The intermediate voltage value is larger than the minimum voltage value and smaller than the maximum voltage value. The maximum voltage instruction value indicates the maximum voltage value. The intermediate voltage instruction value indicates the intermediate voltage value. The minimum voltage instruction value indicates the minimum voltage value. Even in any of the plurality of conditions previously determined for the input light, the drive voltage applied to at least one pixel is larger than the minimum voltage value. Further, a difference between a phase modulation amount achieved when driven by a drive voltage equivalent to an arbitrary voltage value smaller than the maximum voltage value and a phase modulation amount achieved when driven by a drive voltage equivalent to the minimum voltage value is larger as a difference between the arbitrary voltage value and the minimum voltage value is larger. Even in any of the plurality of conditions previously determined, a difference between a phase modulation amount achieved when the at least one pixel is driven by a drive voltage having the maximum voltage value and a phase modulation amount achieved when the same pixel is driven by a drive voltage having the minimum voltage value is equal to or more than $2\pi$. Moreover, preferably, even in any of the plurality of conditions previously determined, a difference between a phase modulation amount achieved when the at least one pixel is driven by a drive voltage equivalent to the intermediate voltage value and a phase modulation amount achieved when the same pixel is driven by a drive voltage equivalent to the minimum voltage value is smaller than $2\pi$. Thereby, the phase modulating apparatus secures at least $2\pi$ in a range of the phase modulation amount relative to a plurality of input light beams. Moreover, to the range of at least $2\pi$ of the phase modulation amount, a reference value of equal to or more than 256 graduations is allotted. Thus, a highly accurate phase modulation amount can be obtained for a desired control input value.

Preferably, the correction condition determining means previously stores therein a plurality of correction conditions, and from among the plurality of correction conditions, selects one correction condition according to the condition of the input light. Thereby, the correction condition determining means can appropriately correct in accordance with the condition of the input light because the same means has selected one correction condition from among the plurality of correction conditions.

Alternately, the phase modulating apparatus may further comprise a step of relational expression saving means for saving a relational expression between a value indicating the condition of the input light and a value indicating the correction condition. In this case, preferably, the correction condition determining means determines a value indicating the correction condition by calculating the relational expression based on the value indicating the condition of the input light. Thereby, the driving means can obtain the correction condition from the condition of the input light by referring to the relational expression. Thus, the correction condition can be effectively obtained.

A phase modulating method according to the present invention is a method of phase-modulating input light by using a reflective electric address spatial light modulator which includes a plurality of pixels each being 2-dimensionally aligned adjacent to each other and in which each pixel phase-modulates the input light in accordance with application of a drive voltage. In particular, the phase modulating method comprises the steps of: setting a condition of the input light; setting an input value for each pixel; determining a correction condition according to the condition of the input light; converting the input value set for each pixel into a corrected input value based on the correction condition; converting the corrected input value into a voltage value; and driving each pixel by a drive voltage having the voltage value, whereby the input light is phase-modulated. Thereby, the correction condition is determined according to the condition of the input light. Thus, the desired phase modulation amount can be obtained by performing an appropriate correction even when the input light changes.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

Effects of the Invention

In accordance with the phase modulating apparatus and the phase modulating method according to the present invention, the correction condition determining means determines the correction condition according to the condition of the input light. Thus, the phase modulating apparatus can obtain the desired phase modulation amount by an appropriate correction, even when the condition of the input light changes.

Figure 1:
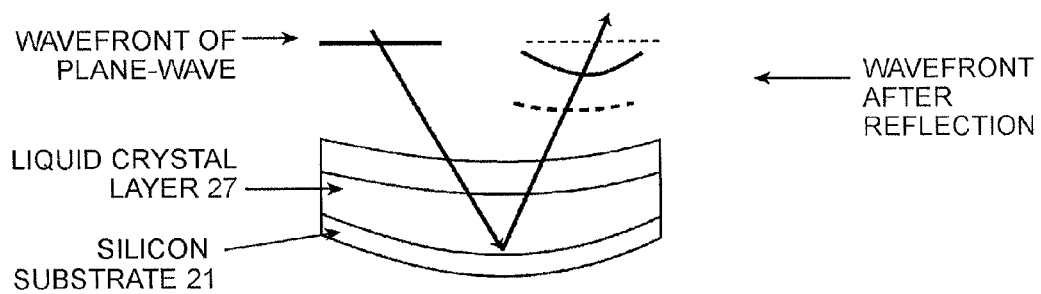
FIG. 1 is a view showing a distortion on the reflective surface of LCOS.

DESCRIPTION OF THE REFERENCE NUMERALS 1, 101, 601 . . . phase modulation system; 10, 10a, 110, 610, 710 . . . LCOS phase modulating apparatus; 2 . . . LCOS-spatial light modulator; 32 . . . correction value deriving unit; 33 . . . control input value converting unit; 34 . . . correction data converting unit; 38 LUT processing unit; 39 . . . DA circuit; 391 . . . driving means; 632 . . . correction value deriving means; 633 . . . control input value converting means; 634 . . . correction data converting means; 635 . . . correction data adding means; 638 . . . LUT processing means; 71 . . . angle correcting LUT; 72 . . . wavelength correcting LUT; 73 . . . offset information; 11 . . . pixel-corresponding LUT; 12 . . . distortion correction data; 13 . . . desired pattern; 17 . . . angle information; 18 . . . wavelength information; 111 . . . group-corresponding LUT; and 211 . . . single LUT.

BEST MODES FOR CARRYING OUT THE INVENTION

In the following, embodiments of a phase modulating apparatus and a phase modulating method according to the present invention will be described in detail with reference to FIGS. 2 to 34. In the description of the drawings, identical or corresponding components are designated by the same reference numerals, and overlapping description is omitted.

First Embodiment

First, a phase modulating apparatus according to a first embodiment and a phase modulating method using the phase modulating apparatus will be described.

Figure 2:
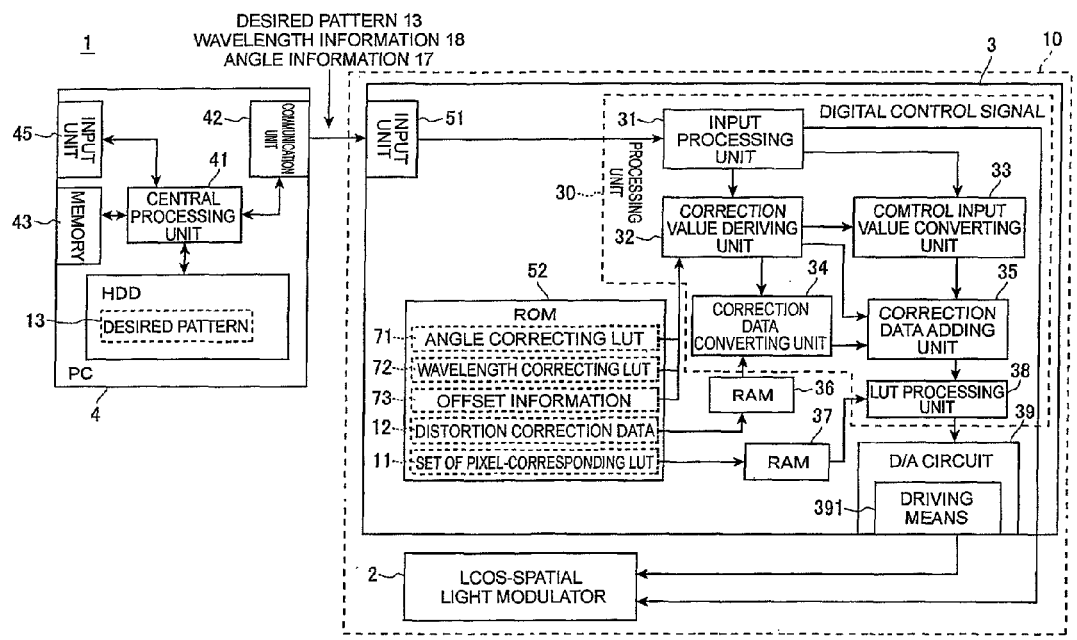
FIG. 2 is a view showing the configuration of a phase modulation system that includes a first embodiment of a phase modulating apparatus according to the present invention.

FIG. 2 is a view showing the configuration of a phase modulation system that includes the first embodiment of the phase modulating apparatus according to the present invention. As shown in FIG. 2, a phase modulation system 1 includes: an LCOS phase modulating apparatus 10 according to the first embodiment; and a control device 4. The LCOS phase modulating apparatus 10 includes an LCOS-spatial light modulator 2 and a driving device 3. The driving device 3 drives the LCOS-spatial light modulator 2 based on voltage, and the control device 4 transmits data such as a desired pattern 13 (described later) to the driving device 3.

Figure 3:
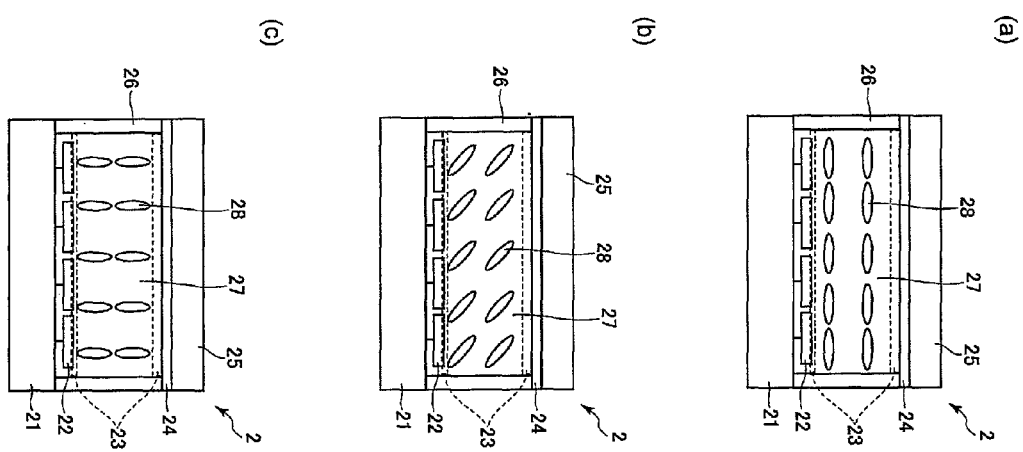
FIG. 3 shows (a) a state of liquid crystal molecules when there is no potential difference between a pixel electrode and an opposite electrode in a parallel orientation-type LCOS-spatial light modulator, (b) a state of the liquid crystal molecules when there is a small potential difference between the pixel electrode and the opposite electrode in the parallel orientation-type LCOS-spatial light modulator, and (c) a state of the liquid crystal molecules when there is a large potential difference between the pixel electrode and the opposite electrode in the parallel orientation-type LCOS-spatial light modulator, respectively.

As shown in the area (a) of FIG. 3, the LCOS-spatial light modulator 2 includes: a silicon substrate 21; and a glass substrate 25 attached via a spacer 26 to the silicon substrate 21. Between the silicon substrate 21 and the glass substrate 25, a liquid crystal layer 27 including liquid crystal molecules 28 is filled. On the silicon substrate 21, a plurality of pixel electrodes 22, and a circuit (not shown) for controlling voltage applied to each pixel electrode 22 are formed. On each pixel electrode 22, an orientation film 23 is formed. Each glass substrate 25 includes an opposite electrode 24 and the orientation film 23. The opposite electrode 24 is in opposition to the pixel electrode 22 via the liquid crystal layer 27. The liquid crystal molecules 28 of the liquid crystal layer 27 are formed in a parallel orientation. The LCOS-spatial light modulator 2, having the pixel electrode 22 made of aluminum, functions as a mirror for reflecting incident light. A single pixel electrode 22 corresponds to a single pixel when the phase modulation is performed. The position of each pixel is expressed by (x, y). In the first embodiment, a total number of the pixel electrodes 22 (pixels) is T (T: positive integer). Each pixel has a unique voltage-dependent phase modulation characteristic and voltage-nondependent phase modulation characteristic.

A circuit for controlling voltage at each pixel electrode 22 (not shown) is, for example, an active matrix circuit. In the active matrix circuit, a transistor and a condenser are disposed in each pixel electrode 22, and a gate signal line, extending in a row direction, for selecting the pixel electrode 22 and a data signal line, extending in a column direction, for supplying an analog voltage signal are connected to the transistor. When the analog voltage signal applied to the data signal line is recorded on the condenser of the pixel electrode 22 selected by applying a Hi signal to the gate signal line, the voltage of the pixel electrode is controlled. When the selected data line and gate line are sequentially switched, a predetermined voltage can be input to all of the pixel electrodes 22.

As shown in the areas (a) to (c) of FIG. 3, a certain voltage is applied to the pixel electrode 22 to rotate the liquid crystal molecules 28. The area (a) of FIG. 3 shows a state of the liquid crystal molecules 28 when there is no potential difference between the pixel electrode 22 and the opposite electrode 24. The area (b) of FIG. 3 shows a state where the potential difference is small, and the area (c) of FIG. 3 shows a state where the potential difference is large. The refractive index relative to a polarization component is changed by the voltage, and thus, the phase of the polarization component is modulated. A voltage range where the pixel electrode 22 can be operated is between P and Q. It is noted that in the first embodiment, P=0 volts and Q=4 Volts.

In order to modulate the phase of light by using the LCOS-spatial light modulator 2, linearly polarized light parallel to the orientation of the liquid crystal is entered from a side of the glass substrate 25. The light enters from the glass substrate 25, propagates through the liquid crystal layer 27, is reflected on the pixel electrode 22, again propagates through the liquid crystal layer 27, and then, exits from the glass substrate 25. The light, which is propagating through the liquid crystal layer 27, is phase-modulated. When the phase is modulated by each pixel electrode 22, a phase distribution of the light can be controlled. Therefore, the LCOS-spatial light modulator 2 is a reflective electric address spatial light modulator capable of controlling a waveform surface.

As shown in FIG. 2, the control device 4 is a personal computer, for example, and includes: a central processing unit 41; a communication unit 42; a memory 43; an HDD (hard disk drive) 44; and an input unit 45. The HDD 44 contains the desired pattern 13. The central processing unit 41 is for controlling the whole of the control device 4.

Figure 5:
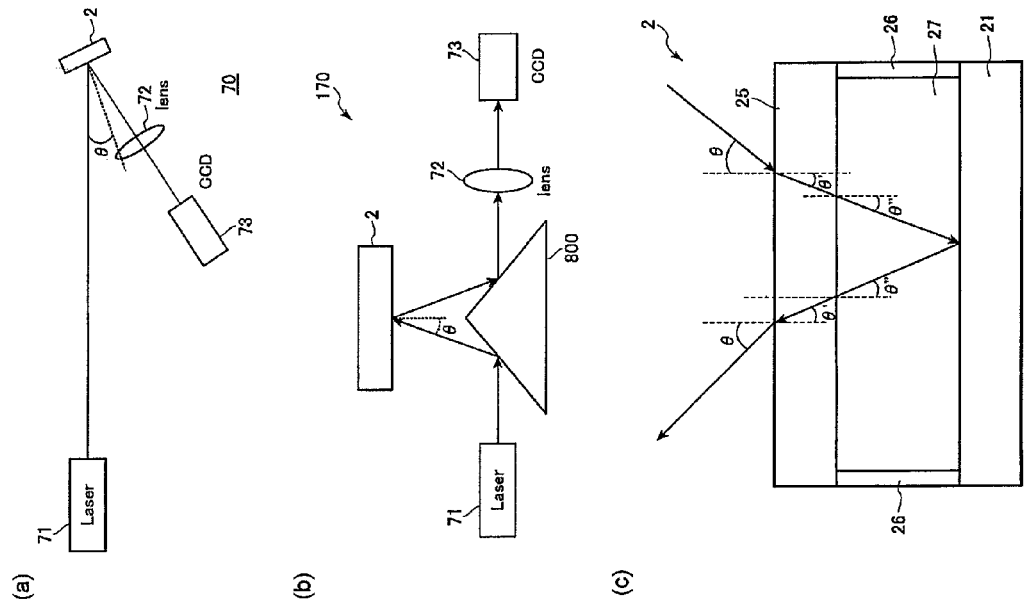
FIG. 5 shows (a) the configuration of an oblique incidence optical system, (b) a modified example of the oblique incidence optical system of the area (a), and (c) a path of light entering the LCOS-spatial light modulator, respectively.
Figure 4:
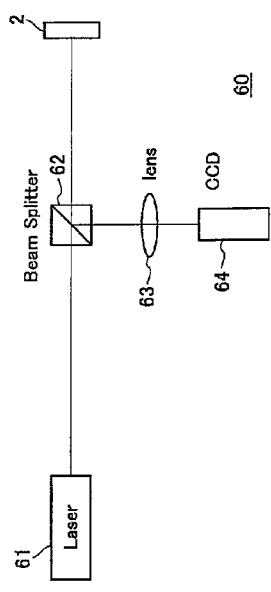
FIG. 4 is a view showing the configuration of a vertical incidence optical system.

The LCOS-spatial light modulator 2 is used and placed in a vertical incidence optical system 60 shown in FIG. 4 or an oblique incidence optical system 70 shown in the area (a) of FIG. 5, for example. The vertical incidence optical system 60 in FIG. 4 includes: a laser light source 61; a beam splitter 62; a lens 63; and a CCD 64. When the LCOS-spatial light modulator 2 is placed in the vertical incidence optical system 60, as shown in FIG. 4, the input light output from the laser light source goes through the beam splitter 62 and then vertically enters a surface on which the pixel electrodes of the LCOS-spatial light modulator 2 are placed.

The oblique incidence optical system 70 in the area (a) of FIG. 5 includes; a laser light source 71; a lens 72; and a CCD 73. When the LCOS-spatial light modulator 2 is placed in the oblique incidence optical system 70, as shown in the area (a) of FIG. 5, the input light output from the laser light source enters the LCOS-spatial light modulator 2 from a direction inclined only by an angle θ (incident angle θ) relative to the vertical line of the surface on which the pixel electrodes 22 of the LCOS-spatial light modulator 2 are placed. It is noted that in FIG. 4 and the area (a) of FIG. 5, only the LCOS-spatial light modulator 2 is illustrated, and the driving device 3 and the control device 4 connected to the LCOS-spatial light modulator 2 are not illustrated.

Moreover, the oblique incidence optical system 70 may be optionally changed to an oblique incidence optical system 170 shown in the area (b) of FIG. 5. That is, a prism 800 can be used so that the incident light enters the LCOS-spatial light modulator 2 by the angle θ. Specifically, the laser light source 71, the prism 800, the lens 72, and the CCD 73 are coaxially placed, and the prism 800 and the LCOS-spatial light modulator 2 are opposite to each other. In this case, the incident light and the exit light are placed coaxially, and thus, placement of the apparatus is facilitated. Moreover, when types of the prism 800 are merely changed, the angle θ can be changed. It is noted that also in the area (b) of FIG. 5, only the LCOS-spatial light modulator 2 is illustrated, and the driving device 3 and the control device 4 connected to the LCOS-spatial light modulator 2 are not illustrated.

The area (c) of FIG. 5 shows a path of light entering the LCOS-spatial light modulator 2, in the oblique incidence optical systems 70 and 170. For the sake of explanation, in the LCOS-spatial light modulator 2, only the glass substrate 25, the spacer 26, the liquid crystal layer 27, and the silicon substrate 21 are illustrated. This means that the pixel electrodes 22 exist along a borderline between the liquid crystal layer 27 and the silicon substrate 21. The light entering an interface between air and the glass substrate 25 by the incident angle θ enters the glass substrate 25 after being refracted at the interface. The resultant light is further refracted at an interface between the glass substrate 25 and the liquid crystal layer 27, and then, enters the liquid crystal layer 27. The light that has propagated through the liquid crystal layer 27 is reflected by the pixel electrode 22, and propagates again through the liquid crystal layer 27. Thereafter, the resultant light is refracted at an interface between the liquid crystal layer 27 and the glass substrate 25, and then, enters the glass substrate 25. The light is further refracted at an interface between the glass substrate 25 and the air, and then, is output into air by an exit angle θ. A relationship among the incident angle θ, the refraction angle θ' at the interface between the air and the glass substrate 25, and the refraction angle θ" at the interface between the glass substrate 25 and the liquid crystal layer 27 is shown below by using Snell's law: Herein, n denotes the refractive index of air, $n_g$ denotes the refractive index of the glass substrate 25, and denotes the refractive index of the liquid crystal layer 27.

$$n_g \sin \theta' = n \sin \theta \quad \text{(S-1)}$$

$$n_L \sin \theta'' = n_g \sin \theta' \quad \text{(S-2)}$$

Hereinafter, the minimum wavelength in a range of a wavelength λ of light output from laser light sources 61 and 71 (expected to be used) is λmin, and the maximum wavelength thereof is λmax, respectively. In the first embodiment, λmin=405 nm and λmax=1064 nm. Moreover, the minimum angle in a range of the incident angle θ (expected to be used) is θmin and the maximum angle is θmax, respectively. In the first embodiment, θmin=0 degrees and θmax=45 degrees. It is noted that in the vertical incidence optical system 60 in FIG. 4, the incident angle θ=0 degrees is established, and in the oblique incidence optical system 70 in the area (a) of FIG. 5, 0<θ≤45 degrees is established. A reference wavelength $\lambda_0$ is set to the minimum wavelength λmin in the wavelength range, and a reference angle $\theta_0$ is set to the minimum angle λmin in the angle range. It is noted that the film thickness of the liquid crystal of the LCOS-spatial light modulator 2 is sufficiently large to achieve a phase modulation amount of equal to or more than 2π in a drive voltage range P to Q for a combination of the maximum wavelength λmax and the maximum angle θmax. As described later, the phase modulation amount of the LCOS-spatial light modulator 2 is smaller as the wavelength λ of the input light is larger or the angle θ of the input light is larger. Therefore, at an arbitrary wavelength within a wavelength range to be used and by an arbitrary angle within an angle range to be used, the phase modulation amount of equal to or more than 2π is achieved in each pixel.

The desired pattern 13 includes, for all the pixels, pixel position information and a value indicating a desired phase modulation amount intended to be achieved in the pixel (hereinafter, called a control input value B). The value indicating the desired phase modulation amount is a digital signal in which the total number of gradations is N (from 0 to N−1). In the first embodiment, N=256. The control input value B of a total N graduations (from 0 to N−1) indicates a phase modulation amount of one cycle (from 0 to 2π). Hereinafter, N is called the number of cyclic graduations.

The input unit 45 receives the angle information 17 of the input light to be input by a user to external input devices such as a keyboard (not shown) and the wavelength information 18 of the input light, and stores these in the memory 43. Alternately, it may be optionally configured that the angle information 17 and the wavelength information 18 detected by the measuring device are output from the measuring device and received by the input unit 43. The input unit 45 includes various components such as a network port, a USB port, a serial port, and a parallel port, and is connected to unillustrated external devices (the keyboard and the measuring devices for measuring the angle information 17 and the wavelength information 18) so that data can be transmitted/received. It is noted that the desired pattern 13, instead of being stored on the HDD 44, may be optionally received from the external device via the input unit 45 and stored in the memory 43.

The angle information 17 indicates the incident angle θ (in the area (a) of FIG. 5) of the input light that enters the LCOS-spatial light modulator 2 and that is relative to the vertical line of the surface on which the pixel electrode 22 is placed. The wavelength information 18 indicates the wavelength λ of the input light entering the LCOS-spatial light modulator 2.

When the phase modulation is performed in the phase modulation system 1, the central processing unit 41 reads out the desired pattern 13 from the HDD 44 to the memory 43. The central processing unit 41 transmits the desired pattern 13, as input data, to the driving device 3 via the communication device 42.

The driving device 3 comprises an input unit 51, a processing unit 30, a ROM 52, RAMs 36 and 37, and a D/A (digital to analog) circuit 39. The processing unit 30 is configured by an FPGA (Field Programmable Gate Array). The processing unit 30 comprises an input processing unit 31, a correction value deriving unit 32, a control input value converting unit 33, a correction data converting unit 34, a correction data adding unit 35, and an LUT processing unit 38. It is noted that the processing unit 30 may be optionally configured by a microcomputer instead of the FPGA. The D/A circuit 39 comprises driving means 391. The ROM 52 comprises an angle correcting LUT 71, a wavelength correcting LUT 72, an offset information 73, distortion correction data 12, and T of pixel-corresponding LUTs 11. When the driving device 3 is started, the pixel-corresponding LUT 11 per pixel is read out from the ROM 52 to the RAM 37, and the distortion correction data 12 is read out from the ROM 52 to the RAM 36. Alternately, the distortion correction data 12 and the pixel-corresponding LUT 11, which are saved on the HDD 44 of the control device 4, may be optionally transferred to the driving device 3 when the phase modulation system 1 is started, and be further transferred to the RAM 36 and the RAM 37, respectively. Further, the RAMs 36 and 37 are integrated to achieve a single RAM, and the single RAM may optionally hold the distortion correction data 12 and the pixel-corresponding LUT 11.

Figures 24, 25:
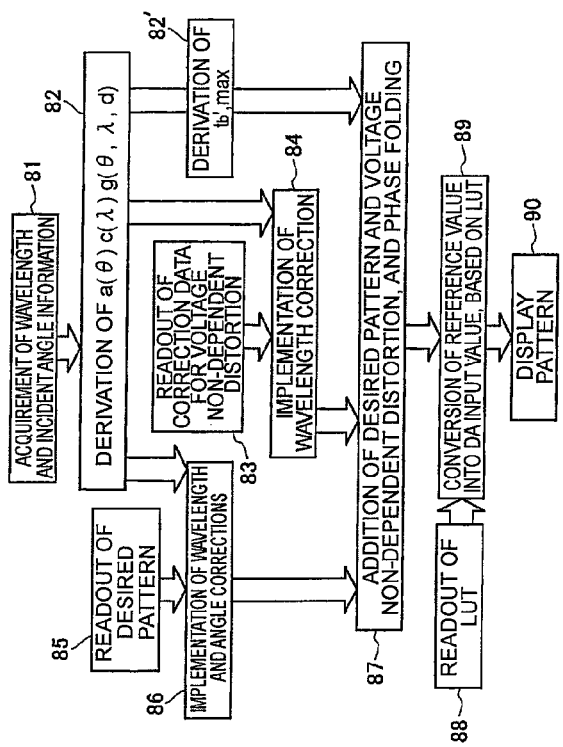
FIG. 24 is a flowchart for explaining a method of using a phase modulation system according to a first embodiment.
FIG. 25 is a picture showing a focal point shape obtained by phase-modulating input light having the incident angle of 0 degrees by using the method in FIG. 20.

In the ROM 52, a program for executing a process along a flowchart described shown later in FIG. 24 is stored. The processing unit 30 executes this program by reading it out from the ROM 52 of the driving device 3 so as to control the whole driving device 3, whereby the process relating to the phase modulation is executed.

Figures 6, 7:
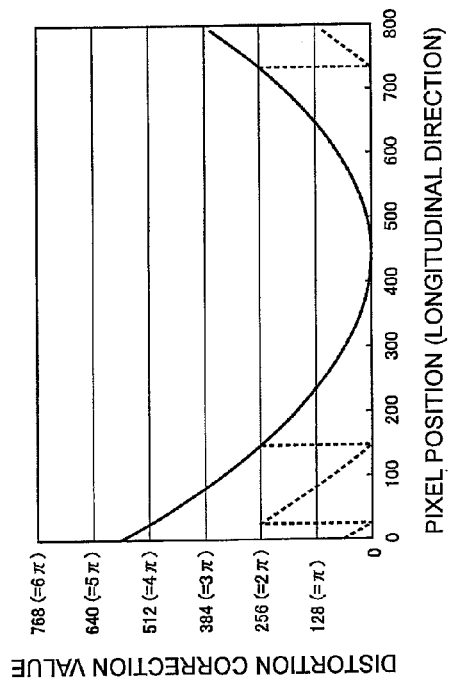
FIG. 6 is a view for explaining distortion correction data.
FIG. 7 is a table showing pixel-corresponding LUTs.

The distortion correction data 12 is for correcting the voltage non-dependent distortion. For all the pixels, the distortion correction data 12 has: the pixel position information; and a value to be added to the control input value B of the desired pattern 13 in the pixel (hereinafter, called a distortion correction value S). The distortion correction value S is expressed by an integer value. N graduations of 0 to N−1 (N: the number of cyclic graduations. In the first embodiment, N=256) in the distortion correction value S correspond to a phase value equivalent to 2π [rad]. FIG. 6 shows one example of the distortion correction data 12 by a solid line. This example shows the distortion correction data 12 corresponding to the LCOS-spatial light modulator 2 having 800×600 pixels. FIG. 6 shows the distortion correction value S in 800 pixels aligned in a lengthwise direction. Phase modulation amounts of 0 to 2π correspond to 0 to 255 of the distortion correction value S. In the pixel near the center (near a pixel position 450), the distortion correction value S is 0. At a pixel position 0, the distortion correction value S is about 576.

There is a one-to-one correspondence between T of pixel-corresponding LUTs 11 and T of pixels. The pixel-corresponding LUT 11 is for correcting the voltage-dependent phase modulation characteristic of the corresponding pixel. FIG. 7 shows an example of the pixel-corresponding LUT 11 relative to one pixel. As shown in FIG. 7, in the pixel-corresponding LUT 11, a plurality of reference values R and a plurality of DA input values A are stored on a one-to-one correspondence basis. The DA input values A are expressed by M graduations from 0 to M−1. Herein, M is an integer in which M>N is satisfied, and in the first embodiment, M=4096 is established. In the first embodiment, the reference value R is expressed by 851 graduations from 0 to 850. FIG. 7 shows the pixel-corresponding LUTs 11, and phase modulation amounts (according to three types of input conditions) corresponding to the DA input values A.

When the voltage-dependent phase modulation characteristic of each pixel is corrected by the pixel-corresponding LUT 11 corresponding to each pixel, the nonlinearity of the voltage-dependent phase modulation characteristic of each pixel can be linearly corrected under an input condition consisting of a combination between any wavelength within the wavelength range to be used and any angle within the angle range to be used. The variation in the voltage-dependent phase modulation characteristic for each pixel can also be corrected.

The input unit 51 comprises a DVI (Digital Video Interface), a network port, a USB port, a serial port, and a parallel port, and is connected to the communication unit 42 so that the data can be transmitted/received. The input unit 51 receives the desired pattern 13, the angle information 17, and the wavelength information 18 from the control device 4, and transfers them to the input processing unit 31.

The input processing unit 31 generates a vertical synchronization signal necessary for driving the LCOS-spatial light modulator 2 based on the desired pattern 13 and a synchronization signal transmitted by the control device 4, and a digital control signal including a horizontal synchronization signal, etc. At the same time, the input processing unit 31 transfers the desired pattern 13 to the control input value converting unit 33. At the same time, the input processing unit 31 further transfers the angle information 17 and the wavelength information 18 to the correction value deriving unit 32.

Figure 8:
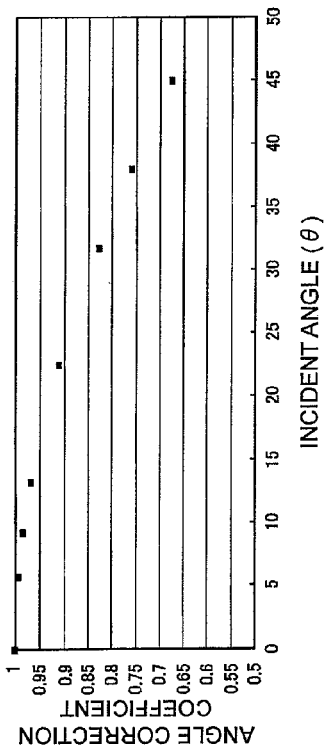
FIG. 8 is a graph showing a relationship between an incident angle and an angle correction coefficient stored in the angle correcting LUT.

The angle correcting LUT 71 stores a plurality of angles θ and values of a plurality of angle correction coefficients a(θ) on a one-to-one correspondence basis. FIG. 8 shows a relationship between the incident angle θ and the angle correction coefficient a(θ) stored in the angle correcting LUT 71. The angle correction coefficient a(θ) reaches the maximum value of 1 when θmin (=0 degrees) is reached, and decreases along with an increase in the angle θ.

Figure 9:
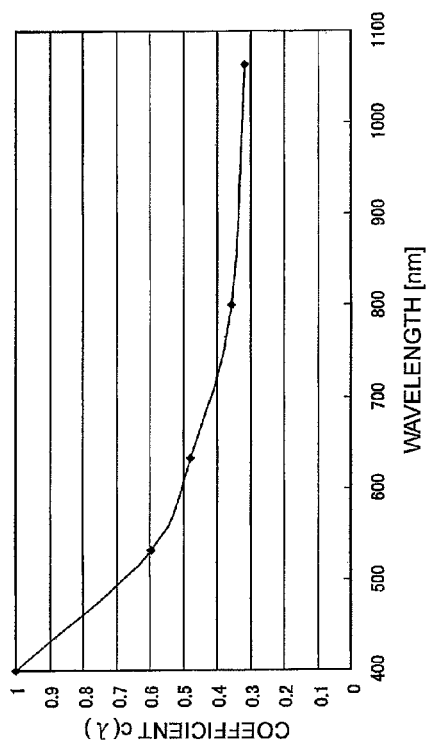
FIG. 9 is a graph showing a relationship between a wavelength and a wavelength correction coefficient stored in the wavelength correcting LUT.

The wavelength correcting LUT 72 stores a plurality of wavelengths and values of a plurality of wavelength correction coefficients c(λ) on a one-to-one correspondence basis. FIG. 9 shows a relationship between the wavelength λ and the wavelength correction coefficient c(λ) stored in the wavelength correcting LUT 72. The wavelength correction coefficient c(λ) reaches the maximum value of 1 when λmin (=405 nm) is reached, and decreases along with an increase in the wavelength λ.

The correction value deriving unit 32 reads out the angle correcting LUT 71 from the ROM 52, and specifies the angle correction coefficient a(θ) corresponding to the angle θ as the angle information 17. The correction value deriving unit 32 reads out the wavelength correcting LUT 72 from the ROM 52, and specifies the wavelength correction coefficient c(λ) corresponding to the wavelength λ as the wavelength information 18.

The offset information 73 indicates: ordinary refractive indices no(λ) relative to a plurality of predetermined wavelengths λ within the wavelength range to be used between λmin and λmax; extraordinary refractive indices ne(λ); and a thickness d(x, y) of the liquid crystal layer 27 for each pixel (x, y). The correction value deriving unit 32 reads out the offset information 73 from the ROM 52, and based on the offset information 73, the angle information 17, and the wavelength information 18, derives an offset graduation value g (θ, λ, d(x, y)) for each pixel position. In particular, the correction value deriving unit 32 first calculates the following equation (1) based on the offset information 73, the angle information 17, and the wavelength information 18, so as to determine the h (θ, λ, d(x, y)) for each pixel. In this case, $\theta_0$ denotes the reference angle, and in the first embodiment, $\theta_0 = \theta min = 0$ degrees. In the equation (1), the pixel position (x, y) at the thickness d(x, y) of the liquid crystal layer 27 is clearly indicated; however, the pixel position (x, y) is appropriately omitted below and only parameters necessary for description are written.

$$h(\theta, \lambda, d(x, y)) = \left( \frac{(n_e(\lambda) * n_o(\lambda) * d(x, y))}{\sqrt{n_e^2(\lambda)\sin^2(j(\theta) - j(\theta_0)) + n_o^2(\lambda)\cos^2(j(\theta) - j(\theta_0))}} \right) * \frac{2\pi}{\lambda} \quad [\text{rad}] \quad (1)$$

In this case, j(θ) denotes an angle θ" (in the area (c) of FIG. 5) relative to a direction vertical to the pixel electrode 22 in a direction the light entering the LCOS-spatial light modulator 2 by the angle θ propagates through the liquid crystal layer 27, and is expressed as follows according to Snell's law (S-1), (S-2):

$$j(\theta) = \theta'' = \arcsin\left(\frac{n}{n_L} * \sin\theta\right) \quad (2)$$

Moreover, the correction value deriving unit 32 uses the wavelength correction coefficient c(λ) so as to calculate the following equation (3), whereby the g(θ, λ, d(x, y)) is calculated for each pixel. It is noted that N denotes the number of graduations assigned to one cycle in the control input value B, and in this example, the number is 256.

$$g(\theta, \lambda, d(x, y)) = h(\theta, \lambda, d(x, y)) * \frac{N-1}{2\pi} \quad (3)$$

The correction value deriving unit 32 further uses the angle correction coefficient a(θ) and the wavelength correction coefficient c(λ) so as to calculate the following equation (4), whereby the number of cyclic graduations N is converted into a corrected number of cyclic graduations $t'_{b,max}$.

$$t'_{b,max} = 1/a(\theta) * 1/c(\lambda) * N \quad (4)$$

That is, the number of cyclic graduations N is the number of graduations assigned to one cycle in the control input value B under incidence conditions (the reference wavelength $\lambda_0$ and the reference angle $\theta_0$). In the first embodiment, the number is 256.

The corrected number of cyclic graduations $t'_{b,max}$ is the number of graduations that should be assigned to one cycle in the control input value B under incidence conditions such as the angle θ or angle information 17 and the wavelength λ or wavelength information 18. The angle correction coefficient a(θ) and the wavelength correction coefficient c(λ) are both values equal to or less than 1, and thus, the corrected number of cyclic graduations $t'_{b,max}$ assumes a value equal to or more than 255.

Moreover, the correction value deriving unit 32 transfers the angle correction coefficient a(θ), the wavelength correction coefficient c(λ), and the offset graduation value g(θ, λ, d) for each pixel to the control input value converting unit 33. At the same time, the correction value deriving unit 32 transfers the angle information 17 and the wavelength correction coefficient c(λ) to the correction data converting unit 34. At the same time, the correction value deriving unit 32 further transfers the corrected number of cyclic graduations $t'_{b,max}$ to the control input value adding unit 35.

The control input value converting unit 33 uses the angle correction coefficient a(θ), the wavelength correction coefficient c(λ), and the offset graduation value g(θ, λ, d) so as to calculate the following equation (5) for each pixel, whereby the control input value B(=$t_b$) is converted into a corrected input value B'(=$t'_b$), and the converting unit 33 transfers the determined corrected input value B'(=$t'_b$) to a correction data adding unit 35.

$$t'_b = 1/a(\theta) * 1/c(\lambda) * t_b + 1/a(\theta) * 1/c(\lambda) * g(\theta,\lambda,d) \quad (5)$$

The correction data converting unit 34 reads out the distortion correction data 12 from the RAM 36. The correction data converting unit 34 determines an angle θ" according to the equation (2) based on the incident angle θ or angle information 17. Based on the input wavelength λ, the minimum wavelength $\lambda_{min}$, and the angle θ", the correction data converting unit 34 multiplies the distortion correction value S of the distortion correction data 12 for each pixel, by $\lambda_{min}/\lambda \cdot (2/\cos \theta")$, whereby the corrected distortion correction value S' is obtained. In this case, the distortion tends to shrink as the wavelength becomes longer. Because $\lambda_{min}/\lambda<1$ is established, when the distortion correction value S is multiplied by the $\lambda_{min}/\lambda$, the wavelength can be corrected. As can be seen from the area (c) of FIG. 5, a relationship of 2F"=2F/cos θ" is established, where 2F denotes a reciprocating optical path of the light advancing through the liquid crystal layer 27 during a vertical incidence and 2F" denotes a reciprocating optical path length of the light advancing through the liquid crystal layer 27 by the incident angle θ". Therefore, when the distortion correction value S is multiplied by 2/cos θ", the angle is corrected.

For each pixel, the correction data adding unit 35 adds the corrected input value B'(=$t'_b$) and the corrected distortion correction value S', and regards the thus obtained added value (B'+S') as the reference value R. It is noted that when the reference value R is larger than the corrected number of cyclic graduations $t'_{b,max}$, the results obtained by folding the phase according to the following equation (6) is modified, and the modified value is used as the reference value R. The correction data adding unit 35 transfers the thus obtained reference value R to the LUT processing unit 38.

$$R = \text{mod}(B'+S'-1/a(\theta)*1/c(\lambda)*g(\theta,\lambda,d), t'_{b,max}) + 1/a(\theta)*1/c(\lambda)*g(\theta,\lambda,d) \quad (6)$$

The LUT processing unit 38 reads out the pixel-corresponding LUT 11 corresponding to each pixel (FIG. 7) from the RAM 37, and by referring to the pixel-corresponding LUT 11 by using the reference value R determined relative to the pixel, reads out the DA input value A corresponding to the reference value R. Thus, the reference value R is converted into the DA input value A. The LUT processing unit 38 transmits the DA input value A of each pixel, together with the position information of the pixel, to the driving means 391.

For each pixel, the driving means 391 converts a value $t_a$ assumed by the DA input value A, into an analog signal C that is a voltage value (P+((Q−P)/(M−1))*$t_a$) within a drive voltage range (P to Q) (in this example, P=0 volts and Q=4 Volts). Then, the driving means 391, which uses the voltage value indicated by the analog signal C as the drive voltage, drives each pixel of the LCOS-spatial light modulator 2.

FIG. 7 shows the pixel-corresponding LUTs 11 and the phase modulation amounts ϕ. It is noted that the latter is achieved in a pixel in which the value assumed by the DA input value A is converted into the corresponding voltage value by the driving means 391 and the resultant value is applied to the corresponding pixel. FIG. 7 shows the phase modulation amounts ϕ under three different incidence conditions: [1] θ=0 degrees and λ=405 nm; [2] θ=0 degrees and λ=1064 nm; and [3] θ=45 degrees and λ=633 nm. However, in the pixel-corresponding LUT 11, the data corresponding to the phase modulation amount ϕ is not stored. The phase modulation amount ϕ has a linear relationship relative to the value assumed by the reference value R. Besides, in a total of T of pixel-corresponding LUTs 11, values to be assumed by the DA input value A are specified so that the phase modulation amounts ϕ corresponding to the respective values of the reference values R are substantially equal to one another under the identical incidence conditions (a combination of the identical wavelength and the identical angle). For example, the values to be assumed by the DA input value A are determined so that under an incidence condition that the reference angle θ is 0 degrees and the reference wavelength λ is 405 nm, if the reference value R is 0, then ϕ is 0.00000, and if the reference value R is 1, then ϕ is 0.00784.

Moreover, the control input value B(=$t_b$) is corrected to the corrected control input value B'(=$t'_b$) based on the incidence condition as in the equation (5), and based on this corrected control input value B'(=$t'_b$), the reference value R is determined. Thus, a relationship between a control input value B before correction and the phase modulation amount ϕ is also linear, and as a result, under any incidence condition, the phase modulation amount ϕ relative to the control input value B is identical.

Therefore, under any input condition, if the pixel-corresponding LUT 11 corresponding to each pixel is used to convert the control input value B of the pixel into the corrected control input value B', the corrected control input value B' is further converted into the DA input value A, this DA input value A is further converted into the analog signal C, and in this state, the voltage is applied, then the phase modulation amount ϕ obtained in each pixel is substantially linear relative to the control input value B before correction and the variation for each pixel is small.

Subsequently, a method of setting the phase modulation system 1 will be explained. In the phase modulation system 1, setting of the wavelength correcting LUT 72, setting of the angle correcting LUT 71, setting of the offset information 73, setting of a correspondence relationship between the DA input value and the drive voltage ranges P to Q, setting of the pixel-corresponding LUT 11, and setting of the distortion correction data 12 are performed in this order.

(Method of Setting the Wavelength Correcting LUT 72)

First, the wavelength correcting LUT 72 is set. In this setting, the LCOS-spatial light modulator 2 is placed in the polarimetric interferometer 90 in FIG. 10 so as to perform the measurement. In this case, the incident angle θ of the incident light is set to 0 degrees.

Figure 10:
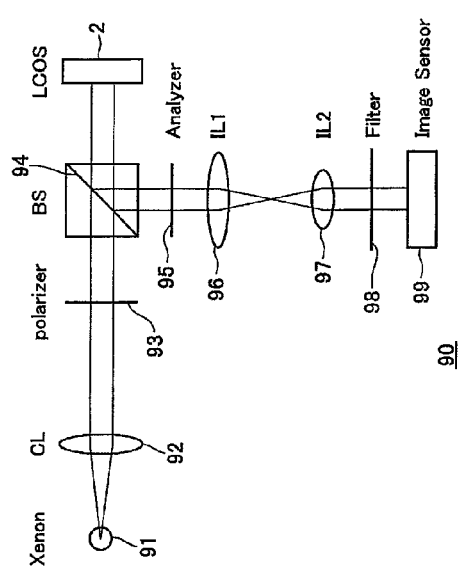
FIG. 10 is a view showing the configuration of a polarimetric interferometer.

The polarimetric interferometer 90 comprises a xenon lamp 91, a collimate lens 92, a polarizer 93, a beam splitter 94, an analyzer 95, image lenses 96 and 97, a bandpass filter 98, and an image sensor 99. The LCOS-spatial light modulator 2 is placed relative to the polarimetric interferometer 90, as shown in FIG. 10. The xenon lamp 91 outputs light with a wavelength of from about 200 nm to about 2000 nm. The bandpass filter 98 is a filter through which only light having a predetermined wavelength is passed. When types of the bandpass filter 98 are changed, a wavelength of the light entering the image sensor 99 can be changed. Therefore, the phase modulation amount relating to a specific wavelength component of the light modulated by the LCOS-spatial light modulator 2 can be measured. It is noted that rather than being placed between the image lens 97 and the image sensor 99, the bandpass filter 98 may be optionally placed at any position on the optical path extending from the xenon lamp 91 to the LCOS-spatial light modulator 2. For example, the bandpass filter 98 may be optionally placed between the xenon lamp 91 and the collimate lens 92.

In accordance with the polarimetric interferometer 90 having such a configuration, the light of which the phase is modulated by the LCOS-spatial light modulator 2 is measured by the image sensor 99. A polarization direction of the polarizer 63 is deviated by 45 degrees relative to the orientation of the liquid crystal molecules of the LCOS-spatial light modulator 2. Thus, the light (incident light) entering the LCOS-spatial light modulator 2 is deviated by 45 degrees relative to the orientation of the liquid crystal molecules 28. When the incident light propagates through the liquid crystal layer 27, a phase difference is caused between a phase-modulated component in the incident light (component parallel to the orientation of the liquid crystal molecules 28) and a component not phase-modulated. Therefore, the polarization direction of the light (reflected light) reflected by the LCOS-spatial light modulator 2 depends on the phase modulation amount of the phase-modulated component in the incident light. Further, the orientation of the analyzer 65 is deviated by 90 degrees relative to the polarizer 93 and the intensity of the light passing through the analyzer 95 depends on the polarization direction of the reflected light. Thus, according to the measurement result of the image sensor 99, the voltage-dependent phase modulation characteristic is measured as an intensity I. The identical voltage is applied to all the pixels thereby to phase-modulate the input light. According to the image sensor 99, the intensity of the light that is modulated in an arbitrary pixel of the LCOS-spatial light modulator 2 and that has reached a position corresponding to that of the image sensor 99 can be measured. From the intensity I obtained at a certain position of the image sensor 99, by using the following equation, for example, the phase modulation amount $\phi$ achieved by the corresponding pixel of the LCOS-spatial light modulator 2 is determined.

$$\phi = 2\sin^{-1}(((I - I_{min})/(I_{max} - I_{min}))^{1/2})[rad]$$

Herein, $I_{max}$ and $I_{min}$ denote a maximum value and a minimum value of the intensity I obtained when the voltage applied to the pixel is changed within an operation voltage range (0 to 4V) of the LCOS-spatial light modulator 2, respectively.

When the phase modulation amount $\phi$ of an arbitrary pixel is determined in a state where any one voltage within the operation voltage range of 0 to 4V is applied equally to all the pixels, the phase modulation amount relative to the voltage of the pixel can be determined.

As the bandpass filter 98, five bandpass filters respectively passing through light components having five different wavelengths (in the first embodiment, 405 nm, 532 nm, 633 nm, 800 nm, and 1064 nm) between the wavelength range to be used $\lambda$min (405 nm) and $\lambda$max (1064 nm) are prepared. Among these, one bandpass filter is placed.

Figure 11:
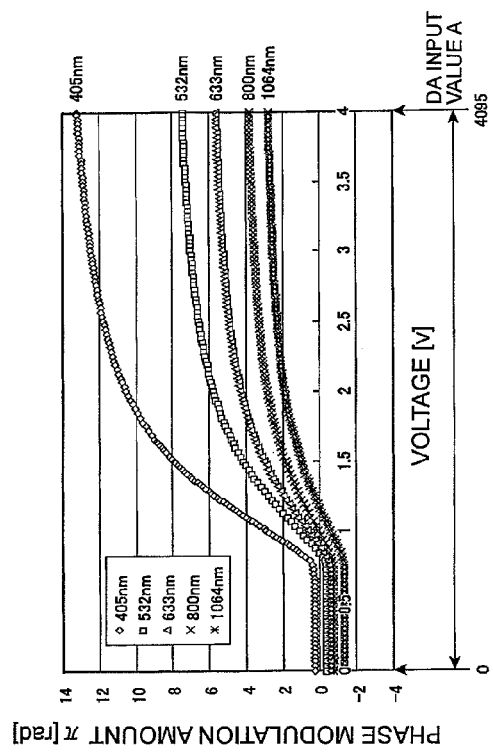
FIG. 11 is a graph showing voltage-dependent phase modulation characteristics relative to five input light components each having a different wavelength.

In a state where one bandpass filter 98 passing through light having one wavelength is placed, the phase modulation amount achieved by one specific pixel of the LCOS-spatial light modulator 2 is measured for each voltage (within the operation voltage range of 0 to 4V). It is noted that the reason why the phase modulation amount is measured relative to the one specific pixel only is that a wavelength dependency is substantially constant across all the pixels. Such a measurement is repeated for all the five wavelengths. FIG. 11 is a graph showing the relationship between the voltage obtained by the above-described measurement and the phase modulation amount for each wavelength $\lambda$. From the graph, it can be seen that in each wavelength $\lambda$, when the voltage is 0, the phase modulation amount (offset phase value) differs.

In the present invention, the reference angle $\theta_0$, an arbitrary wavelength $\lambda$, within the wavelength range to be used relative to the phase modulation amount $\phi$ (V, $\theta_0$, x, y) in the reference wavelength $\lambda_0$, and the phase modulation amount $\phi$ (V, $\theta$, $\lambda$, x, y) at an arbitrary angle $\theta$ within the angle range to be used are defined according to the following equation (7). It is noted that x, y are parameters showing the position of the pixel. Moreover, in the equation (7), the voltage V, the angle $\theta$, the wavelength $\lambda$, and position of the pixel x, y, which are parameters for the phase modulation amount $\phi$, are clearly indicated; however, these parameters are appropriately omitted below and only the parameters necessary for description are written.

$$\phi(V,\theta,\lambda,x,y) = a(\theta)*c(\lambda)*\phi(V,\theta_0,\lambda_0,x,y) - a(\theta)*c(\lambda)*h(\theta,\lambda,d(x,y))[rad] \quad (7)$$

Figure 12:
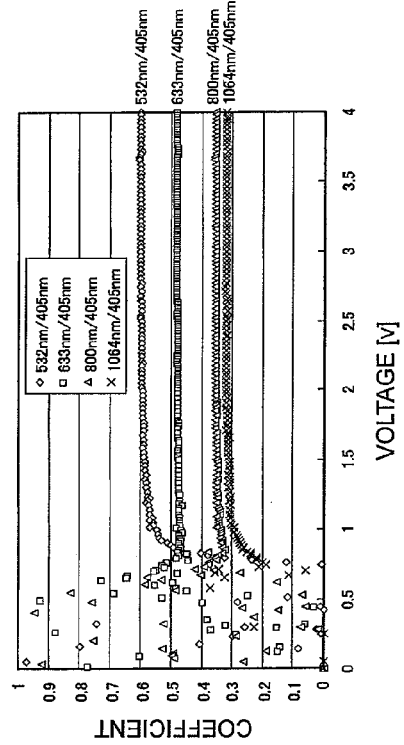
FIG. 12 is a graph obtained by parallel movement of each curve in FIG. 11 in a vertical-axis direction.

In the equation (7), the second term, $a(\theta)*c(\lambda)*h(\theta, \lambda, d)$, indicates the phase modulation amount (offset phase value) when the voltage is 0. Herein, h ($\theta$, $\lambda$, d) is defined as in the above-described equation (1). It is noted that FIG. 12 is a graph showing that each curve in FIG. 11 is translated in a vertical axis direction and the phase modulation amount is 0 when the voltage is 0.

A ratio $c(\lambda, V)$ of the phase modulation amount $\phi(\lambda, V)$ at an arbitrary wavelength $\lambda$ to the phase modulation amount $\phi(\lambda_0, V)$ at the reference wavelength $\lambda_0$ is defined for each voltage V according to the following equation (8).

$$c(\lambda,V) = \phi(\lambda,V)/\phi(\lambda_0,V) \quad (8)$$

Figure 13:
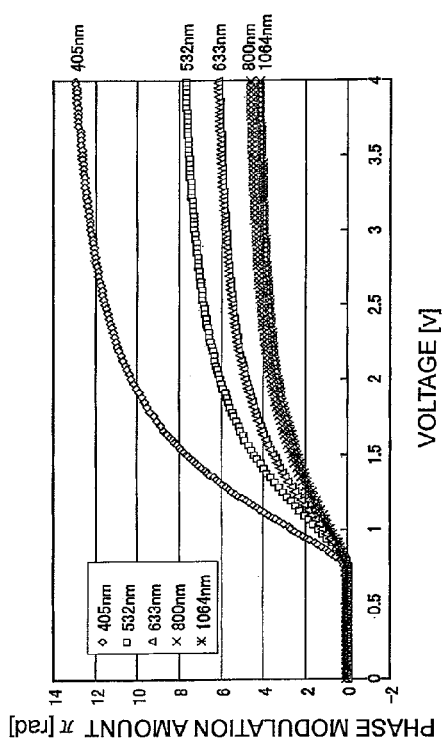
FIG. 13 is a graph showing a ratio of a phase modulation amount at a wavelength $\lambda$ to a phase modulation amount at a reference wavelength $\lambda_0$.

FIG. 13 is a graph showing a relationship between the voltage V and the $c(\lambda, V)$ for each wavelength $\lambda$. As is clear from FIG. 13, at any wavelength $\lambda$, the $c(\lambda, V)$ varies greatly depending on the voltage V in a voltage range of about 0 to 2 volts while in a range of equal to or more than 2 volts, the $c(\lambda, V)$ varies slightly. Such a property is true of all the wavelengths measured.

More particularly, in a predetermined voltage range (in this example, a range of 2 to 4 Volts), the change amount in $c(\lambda, V)$ relative to the change in the voltage V is within a predetermined range (in this case, 0.5) at any wavelength $\lambda$. Therefore, for each wavelength $\lambda$, the wavelength correction coefficient $c(\lambda)$ is set equally in value to $c(\lambda, V)$ relative to any one voltage V within the predetermined voltage range (range of 2 to 4 Volts). Alternately, $c(\lambda)$ may be optionally set to a value equal to an average value of $c(\lambda, V)$ relative to a plurality of voltage values V within the predetermined voltage range (range of 2 to 4 Volts).

A relationship between the measured wavelength $\lambda$, and the wavelength correction coefficient $c(\lambda)$ is saved, as the wavelength correcting LUT 72, in the ROM 52 of the driving device 3. FIG. 9 shows a relationship between the wavelength $\lambda$ and the wavelength correction coefficient $c(\lambda)$ stored in the wavelength correcting LUT 72. It can be seen that at the reference wavelength $\lambda_0$(=405 nm), $c(\lambda)$ is 1, and according to an increase in $\lambda$, $c(\lambda)$ is decreased.

It is noted that in the first embodiment, the five different wavelengths within the wavelength range to be used are measured; the number of wavelengths to be measured, however, is not limited to five. The following may be optionally possible: the relationship between the wavelength $\lambda$ and the wavelength correction coefficient $c(\lambda)$ is approximated by using a polynomial expression thereby to compensate an unmeasured wavelength so as to determine a one-to-one correspondence relationship between a plurality of wavelengths λ and a plurality of wavelength correction coefficients c(λ), and the determined relationship is saved in the wavelength correcting LUT 72. Instead of the wavelength correcting LUT 72, the polynomial expression itself may be optionally stored. Moreover, the one specific pixel is measured for the phase modulation amount. In addition, a phase modulation amount of a plurality of pixels is measured, and the average value thereof is replaced by the phase modulation amount $\phi(\lambda, V)$. In this way, the c(λ, V) may be optionally determined.

(Method of Setting the Angle Correcting LUT 71)

Figure 14:
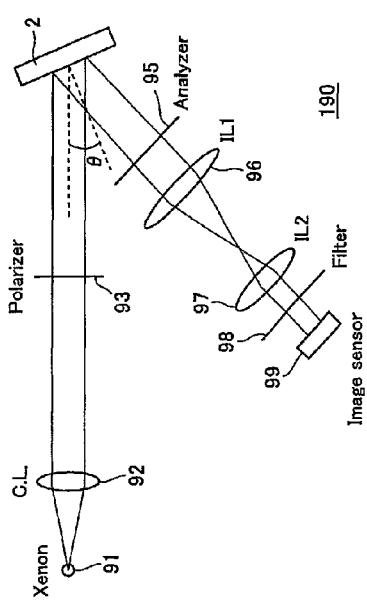
FIG. 14 is a view showing the configuration of an angle-variable polarimetric interferometer.

In order to set the angle correcting LUT 71, the phase modulation amount of the LCOS-spatial light modulator 2 is measured in an optical system 190 in FIG. 14. The optical system 190 is obtained by modifying the optical system 90 in FIG. 10 so that the angle of the same can be varied. That is, the optical system 190 is identical to the optical system 90 except for the following: That is, the optical system 190 is configured so that the beam splitter 94 is removed from the optical system 90. With the arrangement from the xenon lamp 91 to the polarizer 93, the arrangement from the analyzer 95 to the image sensor 99, and orientation of the LCOS-spatial light modulator 2 are adjusted, the incident angle θ can be arbitrarily changed from 0 to 45 degrees.

In the method of setting the angle correcting LUT, as the bandpass filter 98, the bandpass filter 98 passing through light having a wavelength λ=633 nm is used.

Figure 15:
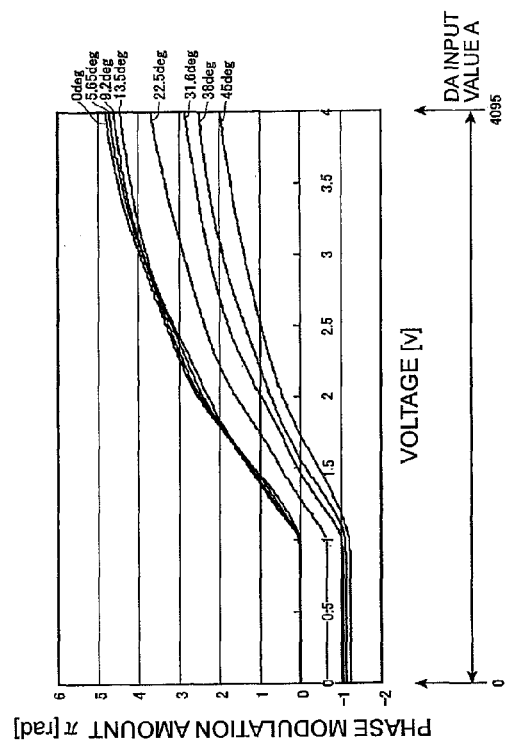
FIG. 15 is a graph showing voltage-dependent phase modulation characteristics of eight input light components each having a different incident angle.
Figure 16:
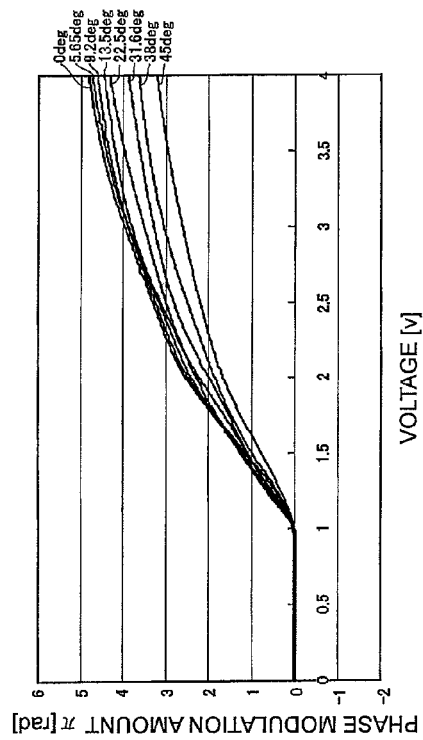
FIG. 16 is a graph obtained by parallel movement of each curve in FIG. 15 in a vertical-axis direction.

The incident angle θ is sequentially set to eight angles (0, 5.65, 9.2, 13.25, 22.5, 31.6, 38, and 45 degrees) within the angle range to be used of θmin=0 to θmax=45 degrees. In a state where the incident angle θ is set to one of the angles, the phase modulation amount achieved in the one specific pixel is measured for each voltage within the operation voltage range of 0 to 4V. It is noted that the reason why the phase modulation amount is measured only in the one specific pixel is that the angle dependency also is substantially identical (not dependent on any particular pixel). When the light obliquely enters, the light obliquely advances in the liquid crystal layer 27. Thus, the light may be influenced by a plurality of pixel electrodes 22 adjacent to one another. However, in the plurality of adjacent pixels, a difference in voltage dependent distortion is negligible, and thus, a change in phase modulation amount caused due to the influence of the plurality of adjacent pixel electrodes 22 is so small that it can be ignored. However, when the LCOS-spatial light modulator 2 is placed in the optical system 190 (FIG. 14), part of the incident light may probably propagate through a portion of the liquid crystal layer 27 corresponding to an outer peripheral region surrounding a region (out of the silicon substrate 21) where a total of T of pixel electrodes 22 are placed, and then, enter the pixel electrode 22. In particular, the pixel electrodes 22 near the outer peripheral region are easily influenced by such light. Thus, for the one specific pixel, the pixel electrode 22 away from near the outer peripheral region is preferably used. Such measurement is repeated for all the eight angles. FIG. 15 is a graph showing the relationship between the voltage obtained by the above-described measurement and the phase modulation amount for each angle θ. From the graph, it can be seen that in each angle θ, when the voltage is 0, the phase modulation amount (offset phase value) differs. FIG. 16 is a graph obtained by translating each curve in FIG. 15 in a vertical axis direction so that the phase modulation amount (offset phase value) is 0 when the voltage is 0. It can be seen that even when a difference in offset phase value is ignored, a characteristic of voltage-phase modulation amount differs for each angle θ.

That is, FIG. 16 is a graph showing a change in phase modulation amount φ arising from the angle correction coefficient a(θ).

A ratio a(θ, V) of the phase modulation amount $\phi(\theta, V)$ in the angle θ, to the phase modulation amount $\phi(\theta_0, V)$ in the reference angle $\theta_0$ is defined for each voltage V according to the following equation (9):

$$a(\theta, V) = \phi(\theta, V)/\phi(\theta_0, V) \qquad (9)$$

Figure 17:
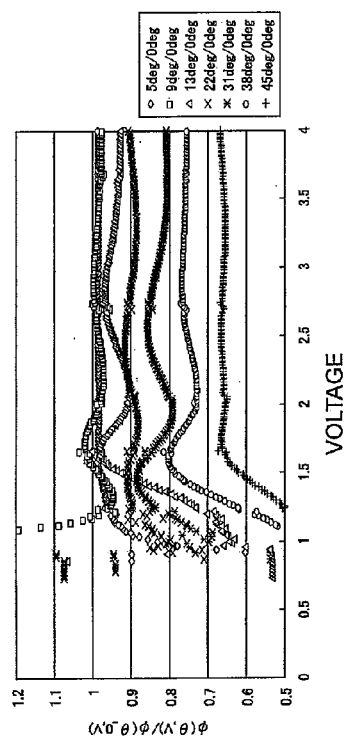
FIG. 17 is a graph showing a ratio of a phase modulation amount at a reference wavelength $\theta_0$ to a phase modulation amount at an angle $\theta$.

FIG. 17 is a graph showing a relationship between the voltage V and the a(θ, V) for each angle θ. As is clear from FIG. 17, at any angle θ, the a(θ, V) varies greatly in a range of about 0 to 2 volts in voltage, and varies slightly in value in a range of equal to or more than 2 volts. Such a property is true of all the angles measured.

More particularly, in a predetermined voltage range (in this example, 2 to 4 Volts), the change amount in a(θ, V) relative to a change in voltage V is within a predetermined range (in this case, 0.5) at any angle θ. Therefore, for each angle θ, the angle correction coefficient a(θ) is set to a value equal to the a(θ, V) relative to any one voltage V within the predetermined voltage range (2 to 4 Volts). Alternately, the angle correction coefficient a(θ) may be optionally set to a value equal to the average value of the a(θ, V) relative to a plurality of voltage ranges V within the predetermined voltage range (2 to 4 Volts).

The relationship between the angle θ and the a(θ) is stored, as the angle correcting LUT 71, in the ROM 52 of the driving device 3. FIG. 8 shows a relationship between the incident angle θ and the angle correction coefficient a(θ) stored in the thus obtained angle correcting LUT 71. It can be seen that at the reference angle $\theta_0$(=0 degrees), the a(θ) is 1, and according to an increase in θ, the a(θ) is decreased.

It is noted that in the first embodiment, eight different types of angles are measured within the angle range to be used; however, the number of angles to be measured is not limited to eight. The following may be optionally possible: the relationship between angle θ and the a(θ) is approximated by using a polynomial expression thereby to compensate an unmeasured angle so as to determine a one-to-one correspondence relationship between a plurality of angles θ and a plurality of angle correction coefficients a(θ), and the determined relationship is saved in the angle correcting LUT 71. Instead of the angle correcting LUT 71, the polynomial expression itself may be optionally stored. The phase modulation amount is measured for the one specific pixel; however, phase modulation amounts of a plurality of pixels are measured, and the average value thereof may be optionally replaced by $\phi(\theta, V)$ so as to determine the a(θ, V).

(Setting the Offset Information 73)

Next, a method of setting a thickness d(x, y) of the liquid crystal layer for each pixel (x, y) provided in the offset information 73, and ordinary refractive indices no(λ) and extraordinary refractive indices ne(λ) relative to each of a plurality of predetermined wavelengths within the wavelength range to be used between $\lambda_{min}$ and $\lambda_{max}$ will be described. In this case, as the plurality of predetermined wavelengths λ, five wavelengths 405 nm, 532 nm, 633 nm, 800 nm, and 1064 nm that are the same as those used for the wavelength correcting LUT 72 are used. Values of the extraordinary refractive index ne(λ1), the ordinary refractive index no(λ1), and the birefringence Δn(λ1) at a certain wavelength λ1 of the liquid crystal layer 27 of the LCOS-spatial light modulator 2 are provided by a manufacturer that has manufactured the liquid crystal layer 27.

First, for each pixel, the thickness d of the liquid crystal layer is determined. Specifically, the LCOS-spatial light modulator 2 is placed in the polarimetric interferometer 90, as shown in FIG. 10, and as the bandpass filter 98, a bandpass filter through which the light at the wavelength λ1 passes is placed. All the pixels are driven by the maximum voltage Vmax (in the first embodiment, 4 Volts) within the drive voltage range (0 to 4V), and the phase modulation amount φ(λ1, Vmax) achieved in each pixel is measured.

In the first embodiment, at the minimum voltage Vmin (=0 volts), the liquid crystal layer 27 is in a parallel orientation state in the area (a) of FIG. 3, and at the maximum voltage Vmax (=4 Volts), the same layer 27 is in a vertical orientation state in the area (c) of FIG. 3. Therefore, the phase modulation amount φ(λ1, Vmax) is the phase modulation amount in the vertical orientation. On the other hand, theoretically, the phase modulation amount φ(λ1, Vmax) in the vertical orientation is defined according to the following equation (10):

$$\phi(\lambda_1, V_{max}) * \lambda_1 / 2\pi = 2 * \Delta n(\lambda_1) * d(x,y) [rad] \quad (10)$$

Therefore, when the phase modulation amount φ(λ1, Vmax) of each pixel obtained by the measurement is substituted into the equation (10), the value of the film thickness d(x, y) for each pixel is obtained.

Subsequently, the extraordinary refractive indices ne(λ) and the ordinary refractive indices no(λ) relative to each of the five wavelengths λ (405 nm, 532 nm, 633 nm, 800 nm, and 1064 nm) within the wavelength range to be used between λmin and λmax are determined. As the bandpass filter 98, five filters through which these five wavelengths λ respectively pass are prepared, and one of them is placed. In a state where as the bandpass filter 98, a filter through which light at one wavelength passes is placed, the minimum voltage Vmin (=0 volts) is applied to all the pixels, and the phase modulation amount φ(λ, Vmin) obtained in one specific pixel is measured, and the maximum voltage Vmax (=four volts) is applied, and the phase modulation amount φ(λ, Vmax) obtained in the one specific pixel is measured. Such a measurement is repeated for all five wavelengths. It is noted that in this measurement, only the one specific pixel is measured. All the pixels are not measured. The reason for that is that the extraordinary refractive indices ne(λ) and the ordinary refractive indices no(λ) are substantially constant for all across the whole pixels (not dependent on any particular pixel).

The extraordinary refractive indices ne(λ) and the ordinary refractive indices no(λ) can be determined for each of the five wavelengths λ based on the phase modulation amount φ(λ, Vmin) and the phase modulation amount φ(λ, Vmax) that are the measurement results as follows: The phase modulation amount φ(λ, Vmax) is a phase modulation amount (phase modulation amount achieved when the liquid crystal molecules 28 are vertically aligned as a result of voltage application) similar to the vertical orientation, and theoretically satisfies the following equation (11): Moreover, the phase modulation amount φ(λ, Vmin) is a phase modulation amount in a parallel orientation, and theoretically satisfies the following equation (12):

$$\phi(\lambda, V_{max}) * \lambda / 2\pi = 2 * \Delta n(\lambda) * d(x,y) \quad (11)$$

$$\phi(\lambda, V_{min}) * \lambda / 2\pi = 2 * n_e(\lambda) * d(x,y) \quad (12)$$

In the equations (11) and (12), the film thickness d(x, y) is a film thickness in a specific pixel in which the phase modulation amount λ(λ, Vmin) and the phase modulation amount φ(λ, Vmax) are measured. Therefore, the measured phase modulation amount φ(λ, Vmax) and film thickness d(x, y) are substituted into the equation (11) so as to determine the birefringence Δn(A) at the wavelength λ.

The measured phase modulation amount φ(λ, Vmin) and film thickness d(x, y) are substituted into the equation (12) so as to determine the extraordinary refractive index ne(λ) at the wavelength λ. Moreover, from the thus determined birefringence Δn(λ) and extraordinary refractive index ne(λ), the ordinary refractive index no(λ) can be determined according to the following equation (13).

$$n_0(\lambda) = \Delta n(\lambda) - n_e(\lambda) \quad (13)$$

The thus determined ordinary refractive index no(λ) and extraordinary refractive index ne(λ) relating to a plurality of predetermined wavelengths λ, and the thickness d(x, y) of the liquid crystal layer for each pixel are saved, as the offset information 73, in the ROM 52 of the driving device 3.

It is noted that in the first embodiment, when the extraordinary refractive index ne(λ) and the ordinary refractive index no(λ) are determined, the five different wavelengths are measured within a range of the wavelength 405 nm to 1064 nm as described above. The number of wavelengths to be measured, however, is not limited to five. The following may be optionally possible: the relationship between the wavelength λ and the extraordinary refractive index ne(λ) and the relationship between the wavelength λ and the extraordinary refractive index no(λ) are approximated by using a polynomial equation thereby compensating an unmeasured wavelength λ so as to determine the relationship between a plurality of wavelengths λ and a plurality of extraordinary refractive indices ne(λ) within the wavelength range to be used and the one-to-one correspondence relationship between a plurality of wavelengths λ and a plurality of extraordinary refractive indices no(λ). Moreover, the polynomial expression representing the relationship between the wavelength λ and the extraordinary refractive index ne(λ) and the polynomial expression itself representing the relationship between the wavelength λ and the extraordinary refractive index no(λ) may be optionally saved in the ROM 52 of the driving device 3.

The phase modulation amount φ(λ, Vmin) and φ(λ, Vmax) are measured for one specific pixel. Alternately, the phase modulation amounts φ(λ, Vmin) and φ(λ, Vmax) are measured for a plurality of pixels, and an average of measurement values φ(λ, Vmin) of a plurality of pixels and an average of measurement values φ(λ, Vmax) of a plurality of pixels are replaced by the phase modulation amounts, φ(λ, Vmin) and φ(λ, Vmax) in the equations (11) and (12).

Figure 18:
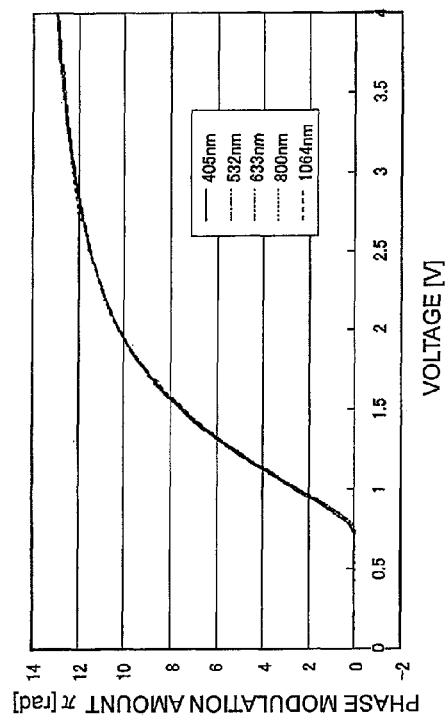
FIG. 18 is a graph obtained by correcting phase modulation amounts relative to input light components with a different wavelength by using a wavelength correction coefficient and an offset phase value.

FIG. 18 is a graph showing amounts obtained by multiplying the phase modulation amount for each wavelength λ of FIG. 11 by $a(\theta) \cdot c(\lambda)$ (where $a(\theta)=1$), respectively, from which $a(\theta) \cdot c(\lambda) \cdot g(\theta, \lambda, d)$ (where $a(\theta)=1$) are subtracted. It can be seen that the difference in phase modulation amount for each wavelength λ is corrected, and the identical phase modulation amount is achieved.

Figure 19:
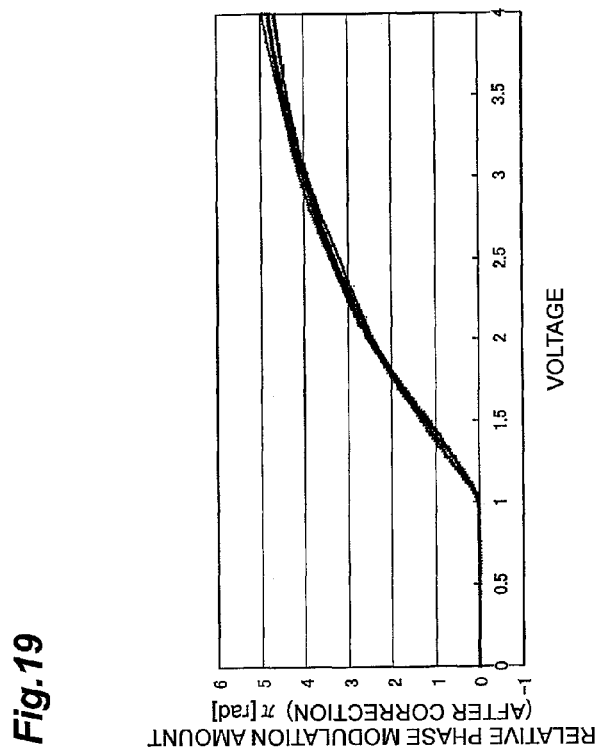
FIG. 19 is a graph obtained by correcting phase modulation amounts relative to input light components with a different angle by using an angle correction coefficient and an offset phase value.

FIG. 19 is a graph showing amounts obtained by multiplying the phase modulation amount for each angle θ in FIG. 15 by $a(\theta) \cdot c(\lambda)$ (where $c(\lambda)=1$), respectively, from which $a(\theta) \cdot c(\lambda) \cdot g(\theta, \lambda, d)$ are subtracted (where $c(\lambda)=1$). It can be seen that the difference in phase modulation amount for each angle θ is corrected, and the identical phase modulation amount is achieved.

(Setting Corresponding Relationship Between DA Input Value and Operation Voltage Range)

To the drive voltage range of 0 to 4V, all 4096 graduations (0 to 4095) of the DA input value A are linearly allotted, as shown in FIG. 11 and FIG. 15. Specifically, to values $t_a (0 \le t_a \le 4095)$ assumed by the DA input value A, a voltage value $4t_a/4095$ [V] is set. When the driving means 391 is set and each DA input value $t_a$ is input, the adjustment is performed so that an analog signal C showing the corresponding voltage value $4t_a/4095$ [V] is output.

(Method of Setting Pixel-Corresponding LUT 11)

Figure 20:
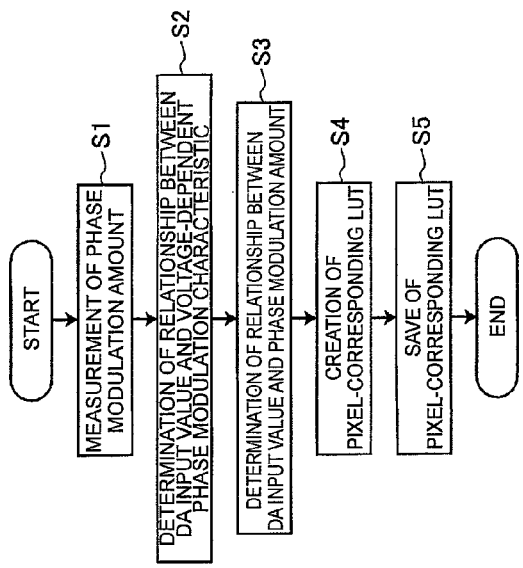
FIG. 20 is a flowchart for explaining a method of setting the LUT.

With reference to FIG. 20, a method of setting the pixel-corresponding LUT 11 is explained. The pixel-corresponding LUT 11 is set after setting the voltage value for a DA input values 0 to 4095 is ended. First, at the step S1, the LCOS-spatial light modulator 2 is placed in the polarimetric interferometer 90, as shown in FIG. 10. As the bandpass filter 98, a filter through which light having a reference wavelength (in this case, $\lambda$min=405 nm) passes is placed. The incident angle $\theta$ is the reference angle $\theta_0$ (=$\theta$min=0 degrees). The relationship between the DA input value A and the voltage-dependent phase modulation amount $\phi$ is determined for each pixel of the LCOS-spatial light modulator 2. That is, the voltage value relative to each value of the DA input values 0 to 4095 is applied to all the pixels so as to measure the phase modulation amount $\phi$ achieved in each pixel. Specifically, any one value of 0 to 4095 is input, as the DA input value A, to the driving means 391 so as to be converted into the analog signal C indicating the corresponding voltage value, the resultant signal is applied to all the pixels of the LCOS-spatial light modulator 2, whereby the phase modulation amount $\phi$ achieved in each pixel is measured. Such a measurement is repeatedly performed on all the 4096 DA input values A of 0 to 4095.

At the step S2, based on the measurement value determined at the step S1, the DA input value-voltage dependent phase modulation characteristic is determined for each pixel. The results are substantially identical to the waveform having a wavelength $\lambda$ of 405 nm in FIG. 11. As is clear from the graph, the DA input value-voltage dependent phase modulation characteristic has nonlinearity. In addition, the phase modulation characteristic varies for each pixel.

At the step S3, based on the DA input value-phase modulation characteristic determined for each pixel at the step S2, the relationship between the phase modulation amount ($\phi$) and the DA input value A is approximated according to a polynomial expression by using a least-square method, for example. For example, if as the polynomial expression, a power polynomial expression in degree of K is used where $t_a$ denotes the DA input value A and $\phi$ denotes the phase modulation amount, then the polynomial expression is expressed by the following equation (14):

$$t_a(\phi) = f(\phi) = \sum_{k=0}^{K} a_k \phi^k \quad (14)$$

When the equation (14) is determined, the relationship between the DA input value ($t_a$) and the phase modulation amount ($\phi$) can be obtained while an influence of measurement noise caused in a light source, an image sensor, etc., can be alleviated. Even when not all the DA input values are measured (the DA input values are measured intermittently), the phase modulation amount for an unmeasured DA input value A can be presumed from the equation (14). In this way, the relationship between the DA input value A and the phase modulation amount $\phi$ (equation (14)) is determined for all the pixels.

At the step S4, based on the thus obtained DA input value-voltage dependent phase modulation characteristic, the pixel-corresponding LUT 11 is created for each pixel. First, from the following equation (15), $t'_{b,max,256}$ is determined, and the maximum value of the reference value R of the pixel-corresponding LUT 11 is set to equal to or more than $t'_{b,max,256}$. It is noted that in the equation (15), $t_{b,max,256}$ is the number of maximum graduations (255) of the control input value B.

$$t'_{b,max,256} = 1/a(\theta_{max})*1/c(\lambda_{max})*t_{b,max,256}+1/a(\theta_{max})*1/c(\lambda_{max}*g(\theta_{max},\lambda_{max},d) \quad (15)$$

When the reference value R is determined, the control input value converting unit 33 converts the control input value B into the corrected control input value B' according to the equation (5). In the equation (5), both the angle correction coefficient $a(\theta)$ and the wavelength correction coefficient $c(\lambda)$ assume a value less than 1, and as a result, the corrected control input value B' is more than 255. Therefore, also in the corrected control input value B' determined by a combination of any angle correction coefficient $a(\theta)$ and any wavelength correction coefficient $c(\lambda)$, the maximum value assumed by the reference value R of the pixel-corresponding LUT 11 is set equal to or more than $t'_{b,max,256}$ so that the corrected control input value B' is equal to any one of the reference value R within the pixel-corresponding LUT 11.

In the first embodiment, the value of $t'_{b,max,256}$ is determined to 830, and thus, a range of the reference value R assumed by the pixel-corresponding LUT 11 is set to 0 to 850. Subsequently, in order that the relationship between the reference value R (control input value B of the reference wavelength $\lambda_0$ (=$\lambda$min) and the reference angle $\theta_0$ (=$\theta$min)) and the phase modulation amount $\phi$ is expressed linearly and a phase of 0 to $6.65\pi$ ($2\pi*851/256$) is expressed by the reference value R of 0 to 850 graduations, the relationship between the control input value ($t_b$) and the phase modulation amount $\phi$ is expressed as follows:

$$\phi(t_b) = (6.65\pi/850) \times t_b + \text{const}[\pi \text{ rad}] \quad (16)$$

Herein, $t_b$ takes integer values of 0 to 850, and const denotes the offset value. This offset value is set to the identical value capable of realizing the equation (16) in all the pixels. The equation (16) is substituted for the equation (14) so as to determine the relationship between the control input value $t_b$ and the DA input value $t_a$. At this time, $t_a$, which is an integer, needs to be rounded (or rounded down or rounded up). If an operation for rounding is expressed by ROUND, then the relationship between $t_b$ and $t_a$ is as follows:

$$t_a = \text{ROUND}[f(\phi(t_b))] \quad (17)$$

The values (0 to 850) of $t_b$ are installed as reference values 0 to 850, and when the reference values 0 to 850 are made to correspond to $t_a$ values determined by the equation (17), the pixel-corresponding LUT 11 is created.

At the step S5, the thus created pixel-corresponding LUT 11 is saved in the ROM 52.

Thus, in the case of the minimum wavelength $\lambda$min and the minimum angle $\theta$min, $a(\theta$min$)=1$ and $c(\lambda$min$)=1$ are established. Therefore, one cycle of the reference value R is indicated in 256 graduations as in the case of one cycle of the control input value B. Consequently, in the case of the minimum wavelength $\lambda$min and the minimum angle $\theta$min, the reference value R of the pixel-corresponding LUT 11 suffices to have 256 graduations (0 to 255). However, when the angle correction and the wavelength correction are performed by using the equation (5), since $a(\theta)$ and $c(\lambda)$ are smaller than 1, the reference value R becomes large. For this reason, the number of graduations of the reference value R of the pixel-corresponding LUT 11 is imparted with larger redundancy than 256 so as to handle all the angles and wavelengths used.

Figure 21:
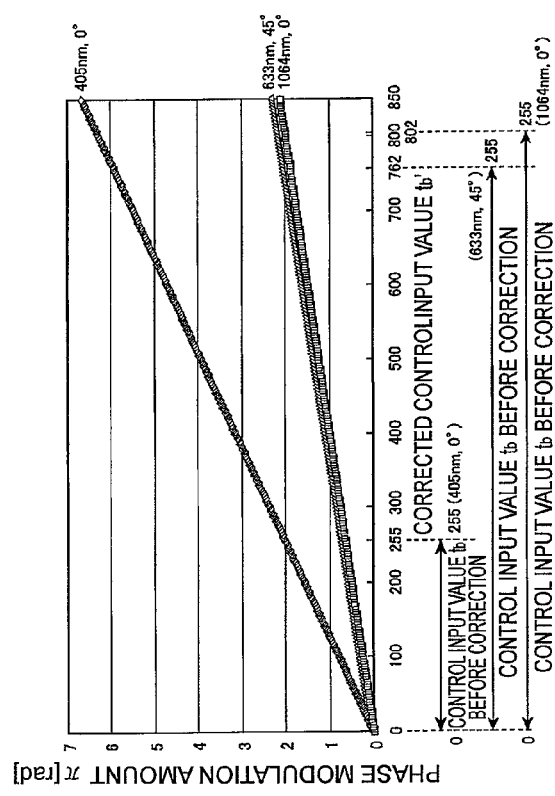
FIG. 21 is a graph showing a relationship between a corrected control input value and a phase modulation amount, in a phase modulation by using a pixel-corresponding LUT.

FIG. 21 is a graph expressing the relationship between the reference value R and the phase modulation amount $\phi$ in FIG. 7. In spite of the different wavelengths, the phase modulation amount φ is linear to the reference value R. When the incidence conditions are λ=405 nm and θ=0 degrees, 256 graduations are secured for the reference value R when the phase modulation amount is between 0 and 2π. When the incidence conditions are λ=1064 nm and θ=0 degrees, the 803 graduations are secured for the reference value R when the phase modulation amount is between 0 and 2π. When the incidence conditions are λ=633 nm and θ=45 degrees, the 763 graduations are secured for the reference value R when the phase modulation amount is between 0 and 2π. That is, between 0 and 2π (range of the necessary phase modulation amount φ), at least 256 graduations can be secured for the reference value R under any incidence condition. Thus, the phase can be accurately modulated.

Under the incidence conditions that the wavelength is 405 nm and the angle is 0 degrees, the phase modulation amounts (0 to 2π) are obtained relative to the control input values B before correction (0 to 255). Moreover, under the incidence conditions that the wavelength is 1064 nm and the angle is 0 degrees, and the wavelength is 633 nm and the angle is 45 degrees, the phase modulation amounts (0 to 2π) are also obtained relative to the control input values B before correction (0 to 255). Even when the incidence conditions change, achieving the identical phase modulation amount φ is always secured relative to the identical control input value B.

(Method of Setting the Distortion Correction Data 12)

Figure 22:
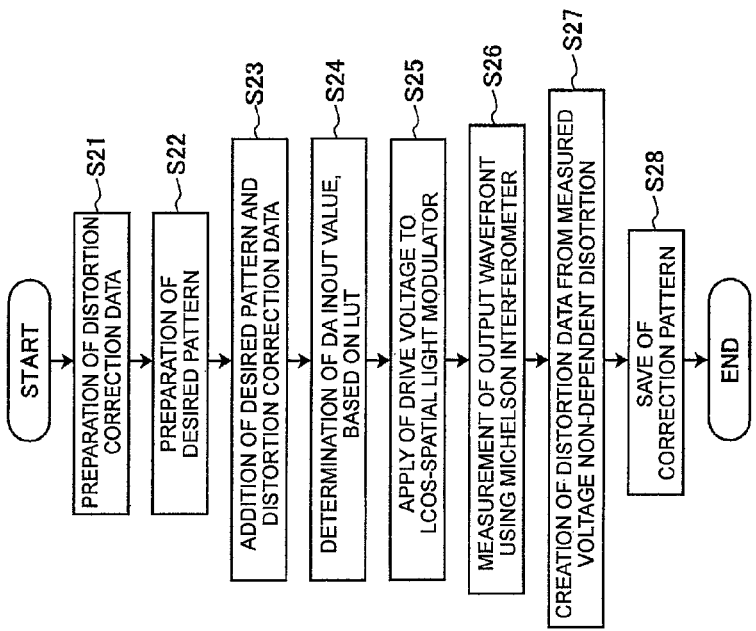
FIG. 22 is a view showing the configuration of a Michelson interferometer.

After the pixel-corresponding LUT 11 is created for each pixel, the distortion correction data 12 is created. The reason for this is that normally, the voltage non-dependent distortion cannot be separately measured, but if the voltage-dependent phase modulation characteristic is corrected by using the pixel-corresponding LUT 11 and an output waveform surface of the LCOS-spatial light modulator 2 is measured, then the voltage non-dependent distortion can be measured. The measurement on the light waveform surface including the voltage non-dependent distortion is performed by using a dual-beam laser interferometer. In the first embodiment, as the dual-beam laser interferometer, a Michelson interferometer 80 shown in FIG. 22 is used. The Michelson interferometer 80 includes: a laser light source 81; a spatial filter 82; a collimate lens 83; a polarizer 84; a beam splitter 85; a mirror 86; image lenses 87 and 88; and a CCD 89. The LCOS-spatial light modulator 2 is placed in the Michelson interferometer 80 as shown in FIG. 22. A polarization direction of the polarizer 84 is parallel to that of the liquid crystal of the LCOS-spatial light modulator 2. An interference pattern produced by interference between a waveform surface reflected by the mirror 86 and a waveform surface reflected by the LCOS-spatial light modulator 2 is measured, and by using the known analyzing method (Fourier transform method) described in the following literature and the known λ/4 phase shift interferometry, the output waveform surface of the LCOS-spatial light modulator 2 can be determined from the measured interference pattern. That is, on the waveform surface reflected by the LCOS-spatial light modulator 2, a voltage non-dependent distortion pattern is formed, and the waveform surface reflected by the mirror 86 is plain. Thus, if the measured interference pattern image is subjected to Fourier transformation and a carrier component is removed, then only the voltage non-dependent distortion can be obtained (see Non-patent Document 6).

That is, as the laser light source 81, in the first embodiment, a light source outputting light having a minimum wavelength λmin is prepared. In the Michelson interferometer 80, the incident angle θ is θmin (=0 degrees).

Figure 23:
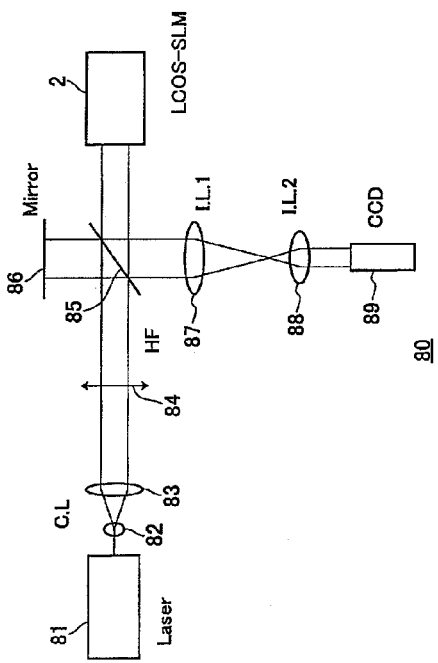
FIG. 23 is a flowchart for explaining a method of creating distortion correction data.

With reference to FIG. 23, a method of creating the distortion correction data 12 used for correcting the voltage non-dependent distortion will be explained. First, at the step S21, in the driving device 3, a pattern in which values of all the pixels are 0 in value is stored, as initial distortion correction data 12, in the RAM 36. At the step S22, the central processing unit 41 sets, as the desired pattern 13, a phase image in which values of all the pixels are any one of 0 to 255 and are equal to each other, and transmits the desired pattern 13 to the input unit 51. At the step S23, the desired pattern 13 is transferred from the input processing unit 31 to the control input value converting unit 33. Simultaneously, the angle information 17 and the wavelength information 18 are transferred from the input processing unit 31 to the correction value deriving unit 32. The correction value deriving unit 32 determines the angle correction coefficient $a(\theta=\theta min)$ (in this case, $a(\theta min)=1$), the wavelength correction coefficient $c(\lambda=\lambda min)$ (in this case, $c(\lambda min)=1$), and the corrected number of cyclic graduations $t'_{b,max}$ (in this case, the number of cyclic graduations N=256). Moreover, the correction value deriving unit 32 transfers the angle correction coefficient $a(\theta)$ and the wavelength correction coefficient $c(\lambda)$ to the control input value converting unit 33, transfers the angle information 17 and the $\lambda_{min}/\lambda$, to the correction data converting unit 34, and transfers the corrected number of cyclic graduations $t'_{b,max}$ to the correction data adding unit 35. The control input value converting unit 33 converts the control input value $B(=t_b)$ of the desired pattern 13 into the corrected control input value $B'(=t'_b)$ according to the equation (5). The corrected control input value B' is transferred to the correction data adding unit 35. The correction data converting unit 34 determines an angle θ" from the angle information 17 by using the equation (2). The correction data converting unit 34 reads out the distortion correction value S of the distortion correction data 12, from the RAM 36. Based on the determined angle θ" and the $\lambda_{min}/\lambda$ received from the correction value deriving unit 32, when the distortion correction value S is multiplied by $\lambda_{min}/\lambda \cdot (2/\cos \theta")$, the corrected distortion correction value S' is determined. The corrected distortion correction value S' is transferred to the correction data adding unit 35.

For each pixel, the correction data adding unit 35 adds the corrected control input value B' of the desired pattern 13, and the corrected distortion correction value S' of the distortion correction data 12. Where necessary, by applying the addition result to the equation (6), folding of the phase is performed, and the addition result or the phase folding result is used as the reference value R. At the step S24, the LUT processing unit 38 converts the reference value R of each pixel into the DA input value A based on the pixel-corresponding LUT 11 of each pixel, and transfers it to the driving device 3. At the step S25, the driving means 391 produces the analog signal C indicated by a voltage value corresponding to the DA input value A, and applies the corresponding voltage to each pixel of the LCOS-spatial light modulator 2. At the step S26, based on output results of the CCD 89, the output waveform surface of the LCOS-spatial light modulator 2 is measured. Because the voltage-dependent phase modulation characteristic has been corrected by using the pixel-corresponding LUT 11, the output waveform surface measured at the step S26 includes the voltage non-dependent distortion only. At the step S27, a sign of the phase value of each pixel indicting the measured output waveform surface is reversed, and the result (hereinafter, called H) is converted into an integer value L that resembles the 256 graduations (0 to 255) indicating phases (0 to 2π). That is, the output waveform surface is expressed at the phase modulation amount [rad], and thus, the integer value L is determined by using an equation (18). Herein, N=256.

$$L = H/2\pi \times (N-1) \quad (18)$$

It is noted that no phase folding is performed on the phase modulation amount H of the output waveform surface. Moreover, when the integer value L to be determined is 256 or more, no phase folding is performed, either. Therefore, the integer value L may be 256 or more. FIG. 6 shows one example of the distortion correction data 12 by a solid line. At the step S28, the integer value L thus determined for each pixel is stored, as the distortion correction data 12, in the ROM 52 of the driving device 3.

A dotted line in FIG. 6 indicates the distortion correction value S obtained when the phase folding of cycle $2\pi$ is performed on the phase modulation amount H of the output waveform surface. Thus, the distortion correction data can be created by performing the phase folding and the created data can be saved. If a process for unfolding the phase folding is performed on the phase-folded distortion correction data during the phase modulation, then the distortion correction data 12, indicated by the solid line, identical to the first embodiment can be obtained. However, the process for unfolding the phase folding is very large in load, and thus, as is demonstrated in the first embodiment, it is preferable to create the distortion correction data 12 without performing the phase folding on the phase modulation amount H or the integer value L. In the first embodiment, it is not necessary to execute the process for unfolding the phase folding, and thus, the load on FPGA can be reduced.

(Method of Using the Phase Modulation System)

The phase modulation system 1 having the above-described structure operates as shown in FIG. 24 to perform the phase modulation. The LCOS-spatial light modulator 2 is used to be placed in the vertical incidence optical system 60 in FIG. 4, the oblique incidence optical system 70 in the area (a) of FIG. 5, or the oblique incidence optical system 170 in the area (b) of FIG. 5. In the vertical incidence optical system 60, $\theta=0$ degrees is established. In the oblique incidence optical systems 70 and 170, the angle $\theta$ is set in a range of $\theta$min to $\theta$max (0 to 45 degrees). As the light source, a light source that outputs light in a range of $\lambda$min to $\lambda$max is used. A user inputs the angle information 17 indicating the incident angle $\theta$ and the wavelength information 18 indicating the wavelength of the light source via a keyboard, etc., connected to the input unit 45. Alternately, the angle information 17 and the wavelength information 18 measured by a measuring device are accepted by the input unit 45.

At the step 81, the central processing unit 41 of the control device 4 temporarily stores the angle information 17 and the wavelength information 18 received by the input unit 45, into the memory 43, and transfers them via the communication unit 42 to the input unit 51 of the driving device 3. The input unit 51 transfers the received angle information 17 and wavelength information 18, to the input processing unit 31. The input processing unit 31 transfers the received angle information 17 and wavelength information 18, to the correction value deriving unit 32.

At the step 82, the correction value deriving unit 32 derives the angle correction coefficient a($\theta$), the wavelength correction coefficient c($\lambda$), the offset graduation value g($\theta$, $\lambda$, d), and the corrected number of cyclic graduations $t'_{b,max}$ based on the angle information 17 and the wavelength information 18 received from the input processing unit 31. The correction value deriving unit 32 transfers the angle correction coefficient a($\theta$), the wavelength correction coefficient c($\lambda$), and the offset graduation value g($\theta$, $\lambda$, d) for each pixel, to the control input value converting unit 33. At the same time, the correction value deriving unit 32 transfers the angle information 17 and the $\lambda_{min}/\lambda$, to the correction data converting unit 34. At the same time, at the step 82', the correction value deriving unit 32 calculates the equation (4) by using the angle correction coefficient a($\theta$) and the wavelength correction coefficient c($\lambda$) so as to convert the number of cyclic graduations N into the corrected number of cyclic graduations $t'_{b,max}$, and transfers this corrected number of cyclic graduations $t'_{b,max}$ to the correction data adding unit 35.

At the step 83, the correction data converting unit 34 reads out the distortion correction data 12 from the RAM 36. The correction data converting unit 34 determines the angle $\theta''$ by using the equation (2) based on the angle information 17. Moreover, at the step 84, the correction data converting unit 34 multiplies the distortion correction value S provided in the distortion correction data 12 for each pixel, by $\lambda_{min}/\lambda \cdot (2/\cos \theta'')$ so as to obtain a corrected distortion correction value S'. The correction data converting unit 34 transfers the corrected distortion correction value S' for each pixel, to the correction data adding unit 35.

On the other hand, at the step 85 in parallel to the step 81, the central processing unit 41 reads out the desired pattern 13 from the HDD 44 to the memory 43, and transfers it from the communication unit 42 to the input unit 51. The input unit 51 transfers the desired pattern 13 to the input processing unit 31. The input processing unit 31 transfers the received desired pattern 13 to the control input value converting unit 33.

At the step 86, the control input value converting unit 33 uses the equation (5) so as to convert the control input value B(=$t_b$) provided in the desired pattern 13 for each pixel, into the corrected control input value B'(=$t'_b$).

At the step 87, for each pixel, the correction data adding unit 38 adds the corrected control input value if and the corrected distortion correction value S' so as to obtain the reference value R. It is noted that when an addition result B'+S' is larger than the corrected number of cyclic graduations $t'_{b,max}$, the equation (6) is employed so as to amend the phase folding result to the reference value R.

At the step 88, the pixel-corresponding LUT processing unit 38 reads out the pixel-corresponding LUT 11 from the RAM 37 for each pixel, and converts the reference value R into the DA input value A at the step 89.

At the step 90, the driving means 391 converts the DA input value A for each pixel, into the analog signal C indicating the voltage value corresponding to the DA input value A, and outputs it to the LCOS-spatial light modulator 2. Simultaneously, when the digital control signal is output from the input processing unit 31, the LCOS-spatial light modulator 2 modulates the phase of the incident light.

It is noted that if there are a plurality of desired patterns 13 and these patterns 13 are combined to perform the phase modulation, then at the step 86, the control input value B of each of the patterns 13 is summed up for each pixel by the control input value converting units 33. It is when the summed result is larger than the number of cyclic graduations N (in the first embodiment, 256), the phase folding process is performed. In the phase folding process, the summed result is divided by the number of cyclic graduations N, and its remainder is replaced by the summed result. The control input value converting unit 33 sets the summed result to the control input value B again, and converts it into the corrected control input value B'.

Figure 26:
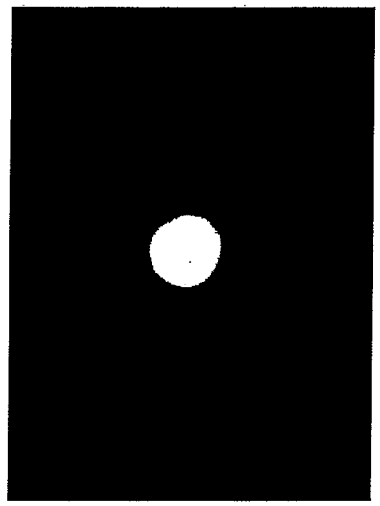
FIG. 26 is a picture showing a focal point shape obtained by phase-modulating input light having the incident angle of 45 degrees by using the method in FIG. 20.

FIG. 25 and FIG. 26 show focal point shapes. It is noted that to obtain these shapes, the incident light is formed into a plane wave according to the above-described phase modulating method, and the plane wave is collected. In FIG. 25, the incident angle θ=0 degrees, and in FIG. 26, the incident angle θ=45 degrees. At either angle, the focal point shape appears as an exact circle. It can be seen that the phase modulation is accurately performed, and the plane wave is accurately obtained.

Figure 27:
FIG. 27 is a picture showing a focal point shape in a comparative example.

On the other hand, in FIG. 27, θ=45 degrees. In this case, the steps 82, 84, and 86 are omitted. That is, the phase modulation is performed without performing the angular correction so as to form the plane wave, which is collected to obtain the shape. In this case, the focal point shape is greatly deviated from the circle. It can be seen that because the phase modulation is not accurately performed, the plane wave is not accurately formed.

First Modified Example of the First Embodiment

In the above-described first embodiment, the input unit 51 is connected to the control device 4, and receives the desired pattern 13, the angle information 17, and the wavelength information 18 from the control device 4. However, the input unit 51 is not necessarily connected to the control device 4, and may suffice to be connected to a device for outputting the desired pattern 13, the angle information 17, and the wavelength information 18. For example, the first modified example 1 may be optionally configured to directly read the desired pattern 13 stored in an external storage device; and further, directly receive the angle information 17 and the wavelength information 18 set by the user through the keyboard. Alternately, it may be optionally configured that the angle information 17 and the wavelength information 18 detected by the measuring device are output from the measuring device and directly received by the input unit 51.

For example, when the LCOS-spatial light modulator 2 is used in a specific optical system only, the angle θ and the wavelength λ are fixed to a predetermined value. In such a case, the angle information 17 and the wavelength information 18 about the predetermined angle θ and predetermined wavelength λ may be optionally saved on the HDD 44. In this case, the central processing unit 41 reads out the angle information 17 and the wavelength information 18 from the HDD 44 into the memory 43, and performs the phase modulation process. Alternately, it may be optionally configured such that a plurality of candidates of the angle information 17 and a plurality of candidates of the wavelength information 18 are saved on the HDD 44, and the user is allowed to select these candidates. When the candidates are selected, an external device such as a keyboard may be optionally used.

Second Modified Example of the First Embodiment

In the above-described first embodiment, it is presumed that both the wavelength λ and the angle θ are changed from the reference wavelength $\lambda_0$ and the reference angle $\theta_0$, and the wavelength λ and the angle θ can be corrected. In the second modified example, it is presumed that the angle θ is fixed to the reference angle $\theta_0$ and the wavelength λ is variable, and the wavelength λ only is corrected. In this case, the configuration of the first embodiment may be changed as follows: That is, the angle information 17 is not input to the control device 4. Further, the ROM 52, in which the wavelength correcting LUT 72 and the offset information 73 are saved, does not contain the angle correcting LUT 71. The correction value deriving unit 32 reads out the wavelength correcting LUT 72 from the ROM 52, and specifies the wavelength correction coefficient c(λ) corresponding to the wavelength information 18. The correction value deriving unit 32 always sets the angle correction coefficient a(θ) to 1.

The correction value deriving unit 32 substitutes $\theta=\theta_0$ into the equation (1) so as to determine the offset graduation value $g(\theta_0, \lambda, d)$ by the equation (3). It is noted that when $\theta=\theta_0$ is substituted into the equation (1), the equation (1) is changed to the following equation (19). When the corrected distortion correction value S' is determined, the angle θ" is 0.

$$h(\theta_0, \lambda, d) = (n_e(\lambda) * d) * \frac{2\pi}{\lambda} \quad [\text{rad}] \tag{19}$$

Third Modified Example of the First Embodiment

In the above-described first embodiment, both the wavelength λ and the incident angle θ are corrected. In the third modified example, the wavelength λ is fixed to the reference wavelength $\lambda_0$, and the angle θ only is corrected. In this case, the wavelength information 18 is not input. Further, the ROM 52, in which the angle correcting LUT 71 and the offset information 73 are saved, does not contain the wavelength correcting LUT 72. The correction value deriving unit 32 reads out the angle correcting LUT 71 from the ROM 52, and specifies the angle correction coefficient a(θ) corresponding to the angle information 17. The correction value deriving unit 32 sets the wavelength correction coefficient c(λ) to 1.

Fourth Modified Example of the First Embodiment

It is noted that the LCOS-spatial light modulator 2 in which when the voltage is 0 volts, the liquid crystal molecules 28 are in parallel orientation (in the area (a) of FIG. 3) has been explained. However, if the liquid crystal molecules 28 are in vertical orientation when the voltage is 0 volts, then h(θ, λ, d) is defined by using the following equation (20) instead of the equation (1) and h(θ, λ, d) in the equation (20) is substituted into the equation (3), the offset graduation value g(θ, λ, d) may be determined.

$$h(\theta, \lambda, d) = \left( \frac{n_e(\lambda) * n_o(\lambda) * d}{\sqrt{n_e^2(\lambda)\cos^2(j(\theta) - j(\theta_0)) + n_o^2(\lambda)\sin^2(j(\theta) - j(\theta_0))}} \right) * \frac{2\pi}{\lambda} \quad [\text{rad}] \tag{20}$$

In particular, when $\theta=\theta_0$, the equation (20) is expressed by the following equation (21):

$$h(\theta_0, \lambda, d) = (n_o(\lambda) * d) * \frac{2\pi}{\lambda} \quad [\text{rad}] \tag{21}$$

Further, the liquid crystal molecules 28 of the LCOS-spatial light modulator 2 are formed to be in parallel orientation when the voltage is 0V; however, the present invention can also be applied to the liquid crystal molecules 28 that is in a hybrid orientation when the voltage is 0V.

Second Embodiment

Figures 28, 29:
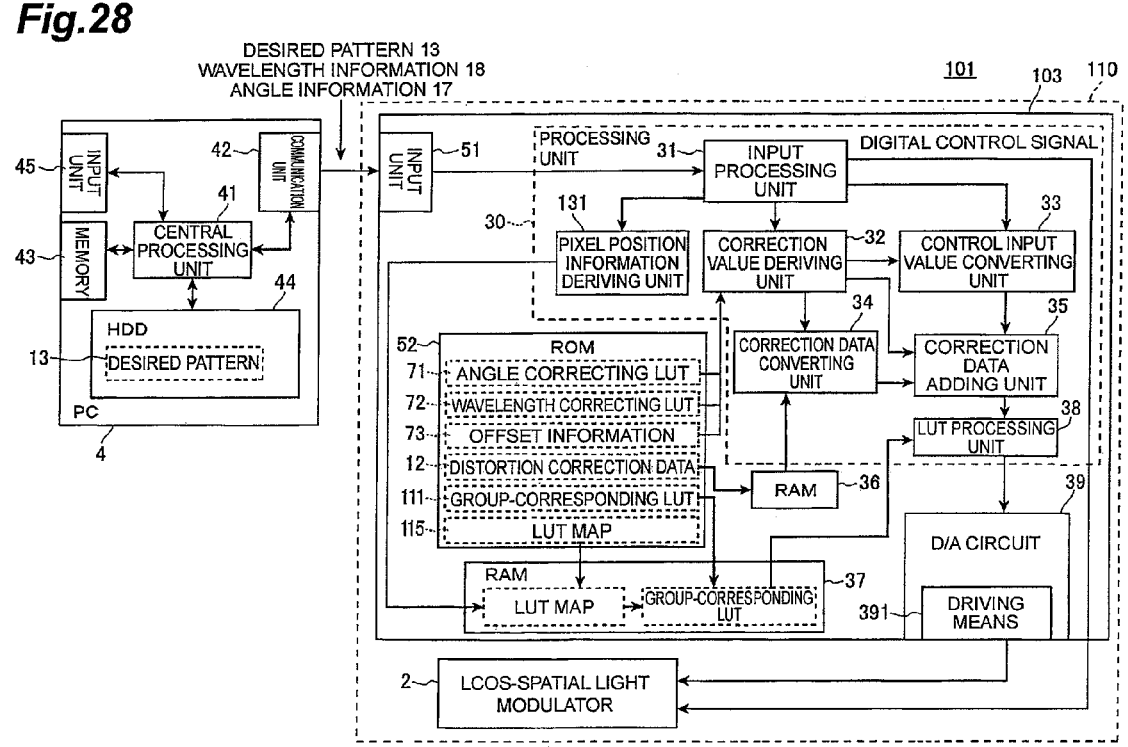
FIG. 28 is a view showing the configuration of a phase modulation system that includes a second embodiment of the phase modulating apparatus according to the present invention.
FIG. 29 is a view showing an example of an LUT map.

FIG. 28 is a view showing the configuration of a phase modulation system that includes a second embodiment of the phase modulating apparatus according to the present invention. In a phase modulation system 101 in FIG. 28, the same constituent components as those in the phase modulation system 1 are assigned the same reference numerals, and overlapping description will be omitted. The phase modulation system 101 includes an LCOS phase modulating apparatus 110 according to the second embodiment and the control device 4. The LCOS phase modulating apparatus 110 includes the LCOS-spatial light modulator 2 and a driving device 103. The driving device 103 has the same configuration as that of the driving device 3 except for the following: That is, the processing unit 30 includes a pixel position information deriving unit 131. The ROM 52 includes a single LUT map 115 and r (r: positive integer satisfying r<T) of group-corresponding LUTs 111. However, T of pixel-corresponding LUTs 11 is not provided. When the phase modulation system 101 is started, the single LUT map 115 and r of group-corresponding LUTs 111 are read out from the ROM 52 to the RAM 37.

The LUT map 115 indicates to which group, out of the r groups, each pixel belongs. To each group, a pixel of which the voltage-dependent phase modulation characteristic is approximated to each other belongs. There is a one-to-one correspondence between the r of group-corresponding LUTs 111 and a total of r of groups. Each group-corresponding LUT 111 is for correcting the voltage-dependent phase modulation characteristic of the pixel belonging to the corresponding group. When the voltage-dependent phase modulation characteristic of each pixel is corrected by each group-corresponding LUT 111 corresponding to the group to which the pixel belongs, the nonlinearity of the voltage-dependent phase modulation characteristic of each pixel can be corrected linearly and the variation in the voltage-dependent phase modulation characteristic for each pixel can be corrected. Similar to the pixel-corresponding LUT 11 of the first embodiment, in each group-corresponding LUT 111, a plurality of reference values R and a plurality of DA input values A are stored on a one-to-one correspondence basis.

FIG. 29 shows an example of the LUT map 115 when r=4 is established. A bold line corresponds to a pixel region including all the pixels, and each region sectioned by a thin line corresponds to each pixel. Each pixel is assigned any one of four group numbers of A, B, C, and D.

In the second embodiment, the processing unit 30 performs the same process as that performed by the processing unit 30 of the first embodiment except for the following: That is, in the second embodiment, the input processing unit 31 transmits the position information of each pixel of the desired pattern 13 to the pixel position information deriving unit 131.

Based on the position information of each pixel in the desired pattern 13, the pixel position information deriving unit 131 refers to the LUT map 115 in the RAM 37 so as to specify the group number of the group to which each pixel belongs. The pixel position information deriving unit 131 transfers the position information in each pixel and the corresponding group-corresponding LUT 111 corresponding to the specified group number from the RAM 37 to the LUT processing unit 38.

For each pixel, the LUT processing unit 38 refers to the group-corresponding LUT 11 corresponding to the pixel so as to convert the reference value R of the pixel, into the DA input value A.

The LUT map 115 is created as follows: Similar to step 2 in the method of setting the pixel-corresponding LUT 11 in the first embodiment, the DA input value-voltage dependent phase modulation characteristic is determined for each pixel. Out of all the pixels, a pixel of which the voltage-dependent phase modulation characteristic is approximated is set as the same group.

In addition, the group-corresponding LUT 111 is created as follows: First, by using the same method of setting the pixel-corresponding LUT 11 in the first embodiment, the LUT 11 for each pixel is created. The pixel-corresponding LUTs 11 corresponding to all the pixels belonging to each group are averaged for the DA input value A for each reference value R, and the resultant average is set to the DA input value of the group. In the group-corresponding LUTs 111, the DA input value A of the group is stored for each reference value R.

In the phase modulation system 101 including the LCOS phase modulating apparatus 110 according to the second embodiment, all the pixels are allotted to a plurality of groups based on the phase modulation characteristic, and the same group-corresponding LUT 111 is used for all the pixels within one group. This eliminates a need for providing the LUT for each pixel, and the phase modulation characteristic of all the pixels can be efficiently corrected by using a small amount of data. Thus, even when it is difficult to install a memory (RAM) having a large capacity in the driving device 103, the group-corresponding LUT 111 can be stored in the driving device 103.

Third Embodiment

Figure 30:
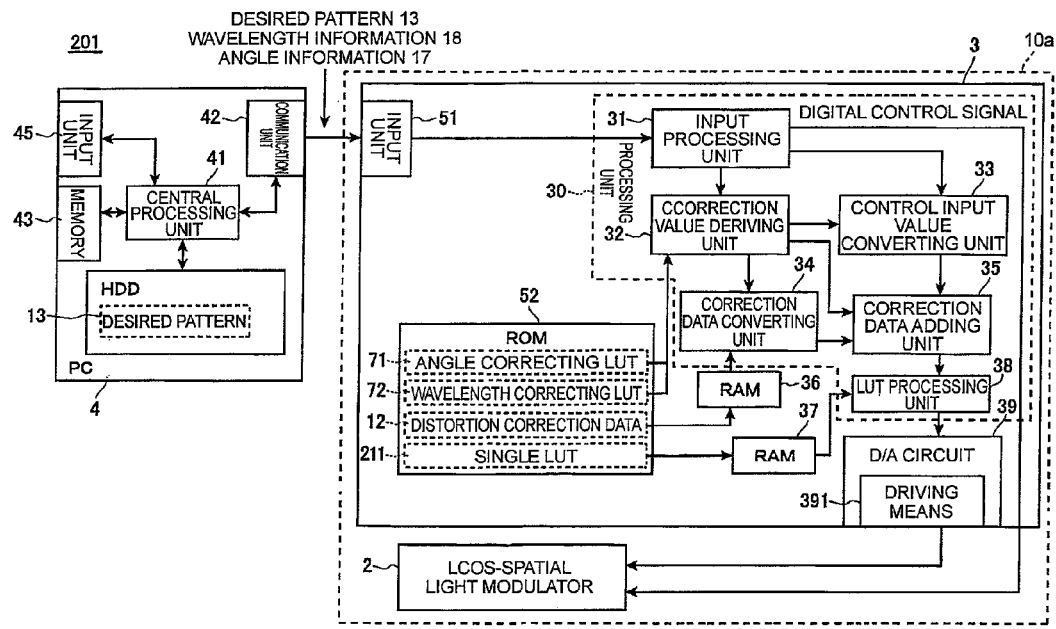
FIG. 30 is a view showing the configuration of a phase modulation system that includes a third embodiment of the phase modulating apparatus according to the present invention.

FIG. 30 is a view showing the configuration of a phase modulation system that includes a third embodiment of the phase modulating apparatus according to the present invention. In FIG. 30, the configuration of a phase modulation system 201 is the same as that of the phase modulation system 1 including the phase modulating apparatus 10 according to the first embodiment except for the following. That is, in a phase modulating apparatus 10a according to the third embodiment, T of pixel-corresponding LUTs 11 are not stored in the ROM 52 but one single LUT 211 is stored. When the phase modulation system 201 is started, the single LUT 211 is read out from the ROM 52 to the RAM 37. Similar to the pixel-corresponding LUT 11 of the first embodiment, in the single LUT 211, a plurality of reference values R and a plurality of DA input values A are stored on a one-to-one correspondence basis. Therefore, in the third embodiment, the single LUT 211 is used to correct all the pixels. The single LUT 211 is created as follows: First, by using the same method of setting the pixel-corresponding LUT 11 in the first embodiment, the LUT 11 for each pixel is created. The pixel-corresponding LUTs 11 corresponding to all the pixels are averaged for the DA input value A for each reference value R. In the single LUT 211, for each reference value R, the average value of the DA input value A is stored again as the DA input value A for all the pixels. In the ROM 52, the angle correcting LUT 71 and the wavelength correcting LUT 72 only are saved, and the offset information 73 is not saved. That is, in the third embodiment, the angle correction and the wavelength correction are performed without regard to the offset information 73. In the third embodiment, all the pixels are corrected by using the single LUT 211.

In particular, the correction value deriving unit 32 transfers the angle correction coefficient $a(\theta)$ and the wavelength correction coefficient $c(\lambda)$ to the control input value converting unit 33. At the same time, the correction value deriving unit 32 transfers the angle information 17 and the wavelength correction coefficient $c(\lambda)$ to the correction data converting unit 34. At the same time, the control input value converting unit 32 also transfers the corrected number of cyclic graduations $t'_{b,max}$ to the correction data adding unit 35.

The control input value converting unit 33 uses the angle correction coefficient $a(\theta)$ and the wavelength correction coefficient $c(\lambda)$ to calculate an equation (22) for each pixel thereby to convert the control input value B(=$t_b$) into the corrected input value B'(=$t'_b$). The same unit 33 transfers the determined corrected input value B'(=$t'_b$) to the pixel-corresponding LUT processing unit 38.

$$t'_b = 1/a(\theta) * 1/c(\lambda) * t_b \tag{22}$$

The LUT processing unit 38 reads out the single LUT 211 from the RAM 37, and converts the reference value R into the DA input value A by referring to this single LUT 211 for every pixel.

In the phase modulation system 201 including the phase modulating apparatus 10*a* according to the third embodiment, the single LUT 211 is used for all the pixels. Thus, even when it is difficult to install a memory (RAM) having a large capacity in the driving device 3, the single LUT 211 can be stored in the driving device 3. Moreover, the correction is performed without determining g($\theta$, $\lambda$, d) regarding the offset, and thus, the wavelength correction and the angle correction can be performed at high speed.

Fourth Embodiment

Figure 31:
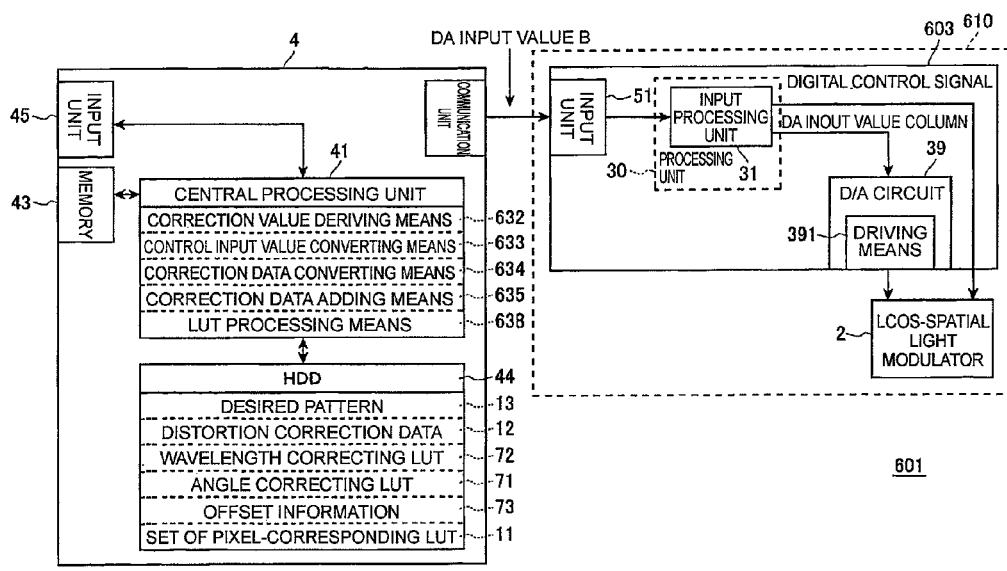
FIG. 31 is a view showing the configuration of a phase modulation system that includes a fourth embodiment of the phase modulating apparatus according to the present invention.

In the above-described first embodiment, the driving device 3 performs the correcting process for correcting the control input value B to the corrected control input value B' and correcting the distortion correction value S to the corrected distortion correction value S'. By contrast, in the fourth embodiment, the correcting process is performed in the control device 4. As shown in FIG. 31, the phase modulation system 601 includes the control device 4 and an LCOS phase modulating apparatus 610 according to the fourth embodiment. The LCOS phase modulating apparatus 610 further includes a driving device 603 and the LCOS-spatial light modulator 2.

In the driving device 603, the processing unit 30 includes the input value processing unit 31 only. The rest of the configuration is the same as that of the driving device 3 in the first embodiment.

The configuration of the control device 4 is the same as that in the first embodiment except for the following: That is, in the fourth embodiment, on the HDD 44, in addition to the desired pattern 13 and the distortion correction data 12, the pixel-corresponding LUT 11, the angle correcting LUT 71, the wavelength correcting LUT 72, and the offset information 73 are saved. The input unit 45 receives the angle information 17 of the input light input by the user through a keyboard, etc., and the wavelength information 18 of the input light, and stores them in the memory 43. The central processing unit 41 includes: correction value deriving means 632; control input value converting means 633; correction data converting means 634; correction data adding means 635; and LUT processing means 638. The driving device 603 includes: the input unit 51; the input processing unit 31; and the D/A (digital to analog) circuit 39.

The central processing unit 41 reads out the pixel-corresponding LUT 11, the angle correcting LUT 71, the wavelength correcting LUT 72, the offset information 73, the desired pattern 13, and the distortion correction data 12, from the HDD 44 to the memory 43.

The correction value deriving means 632 reads out the pixel-corresponding LUT 11, the angle correcting LUT 71, the wavelength correcting LUT 72, the angle correction information 17, and the wavelength correction information 18, from the memory 43. The same means 632 specifies the angle correction coefficient a($\theta$) corresponding to the angle information 17 and specifies the wavelength correction coefficient c($\lambda$) corresponding to the wavelength information 18. The correction value deriving means 632 further reads out the offset information 73 from the memory 43, and based on the angle information 17 and the wavelength information 18, derives the offset graduation value g($\theta$, $\lambda$, d) and the number of corrected cyclic graduations t'$_{b,max}$, for each pixel position, according to the equations (1), (2), and (3).

The control input value converting means 633 reads the desired pattern 13 from the memory 43, receives the angle correction coefficient a($\theta$), the wavelength correction coefficient c($\lambda$), and the offset value g($\theta$, $\lambda$, d) from the correction value deriving means 632, uses the angle correction coefficient a($\theta$), the wavelength correction coefficient c($\lambda$), and the offset value g($\theta$, $\lambda$, d) so as to convert the control input value B(=$t_b$) into the corrected control input value B'($t'_b$) according to the equation (5). The correction data converting means 634 reads the distortion correction data 12 from the memory 43, and from the angle correction information 17 stored in the memory 45, calculates an angle $\theta''$ by using the equation (2). The correction data converting means 634 receives the wavelength correction coefficient c($\lambda$) from the correction value deriving means 632. The correction data converting means 634 multiplies the distortion correction value S by $\lambda_{min}/\lambda \cdot (2/\cos \theta'')$ by using the angle $\theta''$ and $\lambda_{min}/\lambda$ so as to convert the distortion correction value S, for each pixel, into the corrected distortion correction value S'.

The correction data adding means 635 receives the corrected control input value B' from the control input value converting means 633, receives the corrected distortion correction value S' from the correction data converting means 634, sums up the corrected control input value B' and the corrected distortion value S', for each pixel, and sets a summed result (B'+S') to the reference value R. At this time, where necessary, the phase folding is performed on the summed result according to the equation (6), and the result obtained by performing the phase folding is newly set to the reference value R.

The LUT processing means 638 receives the reference value R from the correction data adding means 635 and refers to the pixel-corresponding LUT 11 so as to convert the reference value R into the DA input value A, for each pixel. The central processing unit 41 transfers the DA input value A to the driving device 603 via the communication unit 42.

The input processing unit 31 receives the DA input value A from the input unit 51 so as to generate a vertical synchronization signal necessary for driving the LCOS-spatial light modulator 2 and a digital control signal including, for example, a horizontal synchronization signal. At the same time, the input processing unit 31 transfers the DA input value A to the D/A circuit 39. The driving means 391 converts the DA input value A of each pixel, into the analog signal C indicating the corresponding voltage value. The driving means 391 drives each pixel of the LCOS-spatial light modulator 2 by, as a drive voltage, a voltage value indicated by the analog signal C.

Fifth Embodiment

Figure 32:
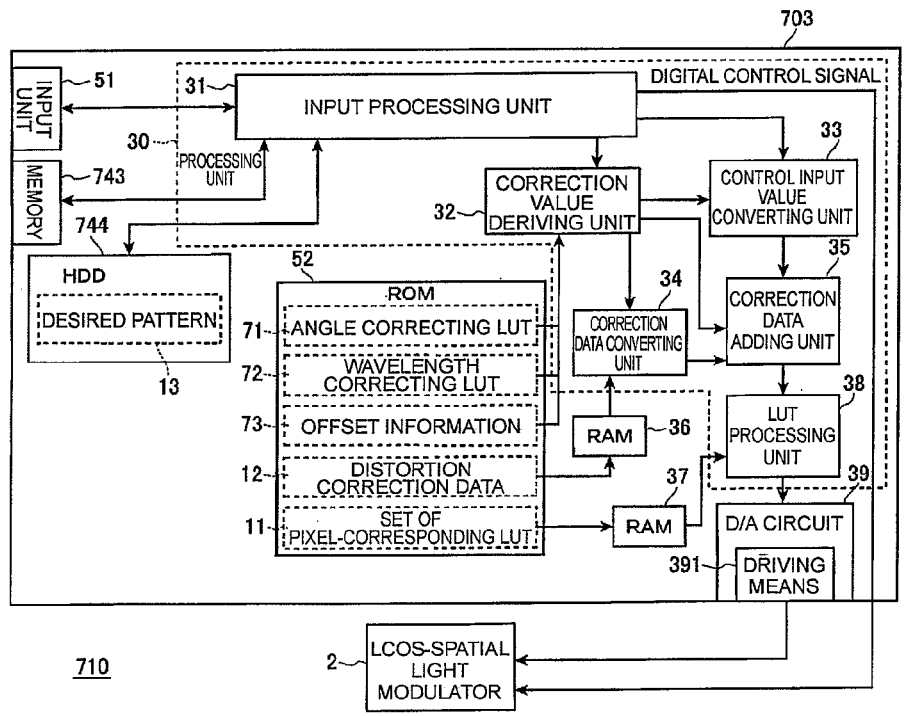
FIG. 32 is a view showing the configuration of a phase modulation system that includes a fifth embodiment of the phase modulating apparatus according to the present invention.
Figure 33:
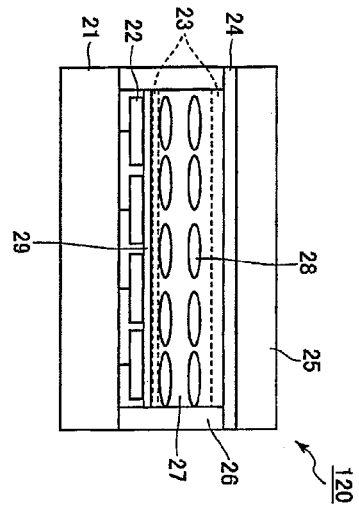
FIG. 33 is a view showing a modified example of the LCOS-spatial light modulator.

In the phase modulation system 1 according to the first embodiment, the control device 4 stores the desired pattern 13 therein, receives the angle information 17 and the wavelength information 18 from the external device, and transmits the desired pattern 13, the angle information 17, and the wavelength information 18 to the driving device 3. Unlike this, a phase modulating apparatus 710 according to the fifth embodiment is not connected to the control device 4, as shown in FIG. 32. The phase modulating apparatus 710 is configured by a driving device 703 and the LCOS-spatial light modulator 2. The process performed by the control device 4 in the first embodiment is executed by the driving device 703. The driving device 703 in the fifth embodiment, which is configured equally to the driving device 3 of the first embodiment, further includes a memory 743 and an HDD 744. The HDD 744 contains the desired pattern 13. The driving device 703 of the fifth embodiment performs the same process as that performed by the driving device 3 of the first embodiment except for the following:

The input unit 51 receives the angle information 17 and the wavelength information 18 input from an external device such as a keyboard and a measuring device, and transfers the received angle information 17 and wavelength information 18 to the input processing unit 31. The input processing unit 31 temporarily stores the angle information 17 and the wavelength information 18 received from the input unit 51, into the memory 743. The input processing unit 31 reads out the desired pattern 13 from the HDD 744 into the memory 43. The input processing unit 31 reads out the desired pattern 13 from the memory 43, and transfers it to the control input value converting unit 33.

For example, when the LCOS-spatial light modulator 2 is used in a specific optical system only, the angle $\theta$ and the wavelength $\lambda$ are fixed to a predetermined value. In such a case, the angle information 17 and the wavelength information 18 about the predetermined angle $\theta$ and predetermined wavelength $\lambda$ may be optionally saved on the HDD 744. In this case, the input processing unit 31 reads out the angle information 17 and the wavelength information 18 from the HDD 744 into the memory 43, and performs the phase modulation process. Alternately, it may be optionally configured such that a plurality of candidates of the angle information 17 and a plurality of candidates of the wavelength information 18 are saved on the HDD 744, and the user is allowed to select these candidates. The candidates may be optionally selected by using an external device such as a keyboard. Alternately, it may be optionally configured such that a display, an input button, etc., are arranged in the driving device 703 and the candidates are selected by using these components.

Even in the second to fifth embodiments, the correction can be performed by using only the wavelength $\lambda$ or using only the angle $\theta$ under the presumption that only the wavelength $\lambda$ or only the angle $\theta$ is variable, similar to the second modified example and the third modified example of the first embodiment.

The method of setting the phase modulating apparatus and the phase modulating apparatus according to the present invention are not limited to the above-described embodiments, and thus, can be modified in various ways within the scope of the claims. For example, in the LCOS-spatial light modulator 2 the pixel electrode 22 serves the mirror. However, as in the case of the LCOS-spatial light modulator 120 shown in FIG. 33, the modulator 120 configured such that a dielectric mirror 29 is laminated on the pixel electrode 22 may be optionally used instead of the LCOS-spatial light modulator 2. In the LCOS-spatial light modulator 120, the same constituent components as those in the LCOS-spatial light modulator 2 are assigned the same reference numerals, and the description is omitted.

Figure 34:
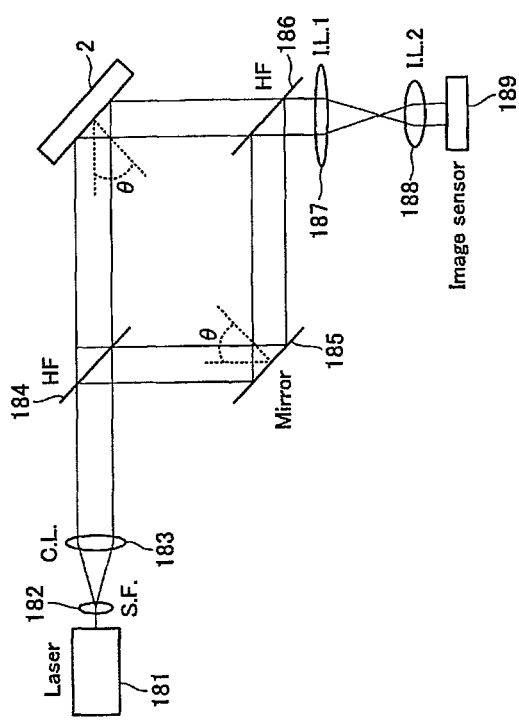
FIG. 34 is a view showing the configuration of a Mach-Zehnder optical system.

The reference angle $\theta_0$ is set to 0 degrees; however, the reference angle $\theta_0$ may be optionally set to other than 0 degrees. In this case, in order to determine the voltage-dependent phase modulation characteristic, the optical system 190 in FIG. 14 can be used. In order to determine the voltage non-dependent phase modulation characteristic, the LCOS-spatial light modulator 2 may be optionally placed in the Mach-Zehnder interferometer 180, as shown in FIG. 34. The Mach-Zehnder interferometer 180 includes: a laser light source 181; a spatial filter 182; a collimate lens 183; a half mirror 184; a mirror 185; a half mirror 186; image lenses 187 and 188; and an image sensor 189.

Moreover, the reference wavelength $\lambda_0$ is set to the minimum wavelength within the wavelength range to be used; however, this is not always the case, and can be set to an arbitrary wavelength.

In this case, however, even when the reference angle $\theta_0$ and the reference wavelength $\lambda_0$ are changed, the following setting is to be made: the LUT 11 is imparted with redundancy, and at all angles $\theta$ within the angle range to be used and at all wavelengths $\lambda$ within the wavelength range to be used, the range of 0 to $2\pi$ can be secured for the phase modulation amount and the number of graduations between 0 and $2\pi$ is equal to or more than 256. This permits the desired phase modulation amount accurately.

The inversion of the applied voltage to the liquid crystal may include any one of: a frame inversion, a line inversion, and a pixel inversion. However, the LCOS-spatial light modulator 2 has a narrow pixel-to-pixel gap, and thus, adopts the frame inversion, which is the most appropriate method of inverting the applied voltage.

An image processing apparatus dedicated to a graphic card, etc., is installed in the control device 4, and a part of the process performed by the control device 4 may be optionally performed in the image processing apparatus.

In the driving device 3, a frame memory connected to the processing circuit may be installed. In this case, the received DA input value A is temporarily stored in the frame memory, and at the same time, data stored in a frame one before at a different location of the frame memory is output to the D/A circuit 39, and a location at which the data is written and a location at which the data is read out are sequentially switched. This eliminates a need for synchronizing a receiving rate of the DA input value A and an output rate to the D/A circuit 39, enabling a frame rate conversion in which the data is output to the LCOS-spatial light modulator 2 at a frame rate different from the receiving frame rate from the control device 4.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The phase modulating apparatus according to the present invention can be applied to laser processing, optical tweezers, an adaptive optical system, various types of imaging optical systems, optical communications, an aspherical surface lens inspection, pulse waveform control of a short-pulse laser, an optical memory, etc.

The invention claimed is:

1. A phase modulating apparatus, comprising:
a reflective electric address spatial light modulator which includes a plurality of pixels each being 2-dimensionally aligned adjacent to each other and in which each pixel phase-modulates input light in accordance with application of a drive voltage;
input light condition inputting means for inputting a condition of the input light;
input value setting means for setting an input value for each pixel;

correction condition determining means for determining a correction condition according to the condition of the input light;

input value converting means for converting the input value set for each pixel into a corrected input value based on the correction condition; and driving means for converting the corrected input value into a voltage value thereby to drive each pixel by using the drive voltage having the voltage value.

2. A phase modulating apparatus according to claim 1, wherein the correction condition determining means determines the correction condition in accordance with an incident angle of the input light.

3. A phase modulating apparatus according to claim 2, further comprising:

correction value output means for outputting a correction value used for correcting a voltage non-dependent distortion; and correction value converting means for converting the correction value output from the correction value output means into a corrected correction value based on the correction condition, wherein the driving means sets the voltage value based on the corrected input value and the corrected correction value.

4. A phase modulating apparatus according to claim 1, wherein the correction condition determining means determines the correction condition in accordance with a wavelength of the input light.

5. A phase modulating apparatus according to claim 4, further comprising:

correction value output means for outputting a correction value used for correcting a voltage non-dependent distortion; and correction value converting means for converting the correction value output from the correction value output means into a corrected correction value based on the correction condition, wherein the driving means sets the voltage value based on the corrected input value and the corrected correction value.

6. A phase modulating apparatus according to claim 1, wherein the correction condition determining means determines the correction condition according to an incident angle of the input light and a wavelength of the input light.

7. A phase modulating apparatus according to claim 6, further comprising:

correction value output means for outputting a correction value used for correcting a voltage non-dependent distortion; and correction value converting means for converting the correction value output from the correction value output means into a corrected correction value based on the correction condition, wherein the driving means sets the voltage value based on the corrected input value and the corrected correction value.

8. A phase modulating apparatus according to claim 1, wherein the reflective electric address spatial light modulator includes an LCOS-spatial light modulator.

9. A phase modulating apparatus according to claim 1, further comprising a step of look-up table storing means for storing therein one look-up table relative to at least one pixel, wherein the look-up table stores a plurality of different reference values and a plurality of voltage instruction values, there is a one-to-one correspondence between the plurality of different reference values and the plurality of voltage instruction values, and each voltage instruction value indicates a corresponding voltage value, and wherein the driving means refers to the look-up table to select the voltage-value instruction value relative to a reference value equal to the corrected input value, and thereafter, determines the voltage value indicated by the voltage instruction value based on the selected voltage instruction value.

10. A phase modulating apparatus according to claim 9, wherein, in the look-up table, the plurality of reference values include a minimum reference value, an intermediate reference value larger than the minimum reference value, and a maximum reference value larger than the intermediate reference value, and at the same time, a total number of reference values larger than the minimum reference value and smaller than the intermediate reference value is 254, wherein the plurality of voltage instruction values include a minimum voltage instruction value corresponding to the minimum reference value, an intermediate voltage instruction value larger than the minimum voltage instruction value and corresponding to the intermediate reference value, and a maximum voltage instruction value larger than intermediate voltage instruction value and corresponding to the maximum reference value, wherein the plurality of voltage instruction values indicate a plurality of voltage values, the plurality of voltage values include a minimum voltage value indicating the minimum voltage instruction value, an intermediate voltage value indicating the intermediate voltage instruction value and larger than the minimum voltage value, and a maximum voltage value indicating the maximum voltage instruction value and larger than the intermediate voltage value, wherein, even in any of the plurality of conditions previously determined for the input light, a difference between a phase modulation amount achieved when the at least one pixel is driven by a drive voltage having an arbitrary voltage value larger than the minimum voltage value and smaller than the maximum voltage value and a phase modulation amount achieved when the at least one pixel is driven by a drive voltage having the minimum voltage value is larger as a difference between the arbitrary voltage value and the minimum voltage value is larger, wherein, even in any of the plurality of conditions previously determined, a difference between a phase modulation amount achieved when the at least one pixel is driven by a drive voltage equivalent to the maximum voltage value and a phase modulation amount achieved when the at least one pixel is driven by a drive voltage equivalent to the minimum voltage value is equal to or more than $2\pi$, and wherein, even in any of the plurality of conditions previously determined, a difference between a phase modulation amount achieved when the at least one pixel is driven by a drive voltage equivalent to the intermediate voltage value and a phase modulation amount achieved when the at least one pixel is driven by a drive voltage equivalent to the minimum voltage value is smaller than $2\pi$.

11. A phase modulating apparatus according to claim 1, wherein the correction condition determining means previously stores therein a plurality of correction conditions, and from among the plurality of correction conditions, selects one correction condition in accordance with the condition of the input light.

12. A phase modulating apparatus according to claim 1, further comprising a step of relational expression saving means for saving a relational expression between a value indicating the condition of the input light and a value indicating the correction condition,
- wherein the correction condition determining means determines a value indicating the correction condition by calculating the relational expression based on the value indicating the condition of the input light.

13. A phase modulating method of phase-modulating input light by using a reflective electric address spatial light modulator which includes a plurality of pixels each being 2-dimensionally aligned adjacent to each other and in which each pixel phase-modulates the input light in accordance with application of a drive voltage, the method comprising the steps of:
- setting a condition of the input light;
- setting an input value to each pixel;
- determining a correction condition in accordance with the condition of the input light;
- converting the input value set for each pixel into a corrected input value, based on the correction condition;
- converting the corrected input value into a voltage value; and
- phase-modulating the input light by driving each pixel with a drive voltage having the voltage value.

* * * * *

UNITED STATES PATENT AND TRADEMARK OFFICE
CERTIFICATE OF CORRECTION

PATENT NO. : 8,576,206 B2  Page 1 of 1
APPLICATION NO. : 12/746183
DATED : November 5, 2013
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this
Twenty-second Day of September, 2015

Michelle K. Lee
*Director of the United States Patent and Trademark Office*